United States Patent [19]
Fujita et al.

[11] Patent Number: 5,647,819
[45] Date of Patent: Jul. 15, 1997

[54] SPEED CHANGE CONTROL METHOD FOR AN AUTOMATIC TRANSMISSION

[75] Inventors: Kenjiro Fujita; Katsutoshi Usuki; Tetsuya Tashiro, all of Tokyo, Japan

[73] Assignee: Mitsubishi Jidosha Kogyo Kabushiki Kaisha, Tokyo, Japan

[21] Appl. No.: 481,335

[22] PCT Filed: Nov. 7, 1994

[86] PCT No.: PCT/JP94/01871
§ 371 Date: Aug. 17, 1995
§ 102(e) Date: Aug. 17, 1995

[87] PCT Pub. No.: WO95/12774
PCT Pub. Date: May 11, 1995

[30] Foreign Application Priority Data

Nov. 5, 1993 [JP] Japan ................. 5-276659
Jan. 31, 1994 [JP] Japan ................. 6-009983

[51] Int. Cl.⁶ ........................................ F16H 61/06
[52] U.S. Cl. ................. 477/140; 477/146; 477/156
[58] Field of Search ........................ 477/70, 79, 80, 477/140, 141, 143, 144, 148, 156, 146

[56] References Cited

U.S. PATENT DOCUMENTS

| | | | |
|---|---|---|---|
| 4,674,364 | 6/1987 | Shindo et al. | 477/146 |
| 4,733,580 | 3/1988 | Kubo et al. | 477/129 |
| 5,038,286 | 8/1991 | Asayama et al. | 477/143 X |
| 5,094,130 | 3/1992 | Hirose et al. | 477/144 X |
| 5,345,843 | 9/1994 | Fujita et al. | 477/156 |
| 5,370,016 | 12/1994 | Fujita et al. | 477/155 |
| 5,435,796 | 7/1995 | Fujita et al. | 477/120 |
| 5,439,427 | 8/1995 | Enokido et al. | 477/143 X |
| 5,443,432 | 8/1995 | Fujita et al. | 477/156 |
| 5,445,577 | 8/1995 | Fujita et al. | 477/154 |
| 5,445,579 | 8/1995 | Fujita et al. | 477/98 |
| 5,460,583 | 10/1995 | Kitada et al. | 477/148 X |

FOREIGN PATENT DOCUMENTS

| | | | |
|---|---|---|---|
| 61-99753 | 5/1986 | Japan. | |
| 3-194254 | 8/1991 | Japan. | |
| 3-229057 | 10/1991 | Japan. | |
| 4-194452 | 7/1992 | Japan | 477/141 |
| 5-312256 | 11/1993 | Japan | 477/156 |
| 6-193720 | 7/1994 | Japan | 477/148 |

*Primary Examiner*—Khoi Q. Ta

[57] ABSTRACT

A speed change control method for an automatic transmission is provided, which is capable of reducing a shift shock and a required shifting time period. A skip down-shift from a first shift position to a second shift position is effected by way of a third shift position which is not used in a normal shifting. If it is determined that a difference $(N_{TM}-N_T)$ between the present turbine rotation speed $N_T$ and the synchronous rotation speed $N_{TM}$ for the third shift position becomes smaller than a threshold value $\Delta N_{FM}$ during the shifting from the first shift position to the third shift position, a control for releasing a friction engaging element 23, corresponding to a releasing side speed-changing element of the third shift position, is started prior to establishment of the third shift position, whereby a time period for establishing the third shift position is shortened, so that a shift shock and a required shifting time period are reduced.

11 Claims, 15 Drawing Sheets

SPEED CHANGE CONTROL METHOD FOR AN AUTOMATIC TRANSMISSION

TECHNICAL FIELD

This invention relates to a speed change control method for an automatic transmission, and more particularly, to a speed change control method for an automotive automatic transmission, which reduces a shift shock caused by a skip down-shift and shortens a time period required for a speed change.

BACKGROUND ART

An automotive automatic transmission generally includes a transmission mechanism having planetary gears which include speed-changing elements (hereinafter referred to as gears) such as sun gears and planetary carriers, and hydraulic friction engaging elements such as hydraulic wet type multiple disk clutches and hydraulic band brakes (hereinafter referred to as clutches and brakes, respectively). In an automatic transmission of this type, a shift position connection is changed from a first speed to a second speed by releasing one(s) of the friction engaging elements associated with the first speed and by engaging another friction engaging element(s) associated with the second speed, to select gears which contribute to torque transmission, to thereby establish a desired shift position.

In recent years, in order to improve the drivability of automobiles and reduce the fuel consumption, attempts are made to further enhance the degree of electronic control for the automatic transmission and increase the number of shift positions or transmission stages. A typical multistage automatic transmission includes a main transmission mechanism having an existing transmission mechanism and a subsidiary transmission mechanism coupled in line, with respect to torque transmission, with the main transmission mechanism. Those two transmission mechanisms which contribute to torque transmission are combined in various manners, to thereby establish an arbitrary one of a required number of shift positions, e.g., five forward speeds and one reverse speed. For example, the speed position in the main transmission mechanism is changed over to effect a speed-changing operation among a first speed, a second speed, and a third speed, and the speed position in the subsidiary transmission mechanism is changed over to effect a speed-changing operation between the third speed and a fourth speed. Further, to carry out a speed-changing between the fourth speed and a fifth speed, the speed position in the main transmission mechanism is changed over, with the gear engagement state (torque transmission path) in the subsidiary transmission mechanism set to correspond to the fourth speed. In other words, by use of the subsidiary transmission mechanism, a switching is made between the lower-speed shift positions including the first through third speeds and the higher-speed shift positions including the fourth and fifth speeds.

In an electronic controlled automatic transmission, a shift map determined as a function of vehicle speed and a throttle valve opening degree, as shown in FIG. 8, is generally used to select a shift position. From this map, an optimum shift position (target shift position) suitable to detected values of the vehicle speed and throttle valve opening degree is selected. In the case of a kick-down at a rapid acceleration, the target shift position is generally determined by the throttle valve opening degree. That is, when the throttle valve opening degree traverses the 5–4 shift line or 4–3 shift line as shown in FIG. 8, a down-shift command is output. As a result, if the accelerator pedal is depressed by the driver and the throttle valve opening degree $\theta$ reaches the point B from the point A in FIG. 8, a down-shift is carried out from the fifth speed to the fourth speed. When the throttle valve opening degree $\theta$ reaches the point C from the point A, a so-called skip down-shift from the fifth speed to the third speed is effected.

On an occasion that a skip down-shift from the fifth speed to the third speed is effected in the aforementioned multi-stage automatic transmission, it is necessary to make the changeover of speed positions in both of the main and subsidiary transmission mechanisms. However, it is generally extremely difficult to simultaneously control a plurality of transmission mechanisms. For example, if both of the main and subsidiary transmission mechanisms are simultaneously controlled at the time of a skip down-shift, the release operation timing of the friction engaging element on the released side of the main and/or subsidiary transmission mechanism may be sometimes deviated from the optimum timing. In such a case, the turbine rotation speed of a torque converter of the automatic transmission (the rotation speed of the input shaft of the main transmission mechanism) rapidly rises. As a result, there is a fear that a large shift shock occurs or the concerned is broken when the friction engaging element on the engaging side of the main and/or subsidiary transmission mechanism is brought into engagement.

Further, in the automatic transmission, the speed change control is generally effected based on the outputs of two rotation speed sensors respectively indicating the rotation speeds of the input and output shafts of the transmission. However, the speed-changing condition in each of the main and subsidiary transmission mechanisms cannot be detected based on the outputs of the two sensors. Therefore, it is extremely difficult to simultaneously control the speed-changing operations in both of the transmission mechanisms based on the two sensor outputs. Provision of additional rotation speed sensors makes it possible to detect the speed-changing condition of each transmission mechanism, and, in turn, to simultaneously control a plurality of transmission mechanisms. In this case, however, the cost rises.

Conventionally, therefore, in order to carry out a skip down-shift, the speed position in the main transmission mechanism is first changed over, and then the changeover of the speed position is made in the subsidiary transmission mechanism. For example, for the down-shift from the fifth speed to the third speed, a method has been adopted in which the fourth speed is temporally established during the downshift, so that the downshift is carried out by way of the fourth speed. However, this type of speed change control method entails the following defects.

As is well known in the art, a hydraulic piston serving as driving means for a hydraulic friction engaging element has play or ineffective stroke. This requires a so-called play eliminating operation which must take place before the operation of releasing or engaging the clutch or brake is actually started. Therefore, even if a down-shift command for instructing a shifting to the third speed is issued immediately after temporarily establishing the fourth speed, the fourth speed is kept established during a time period in which the play eliminating operation is carried out. Further, to establish the fourth speed, it is necessary to make a time-consuming determination as to the synchronization of rotation speeds of the input and output shafts of the transmission. According to the conventional method in which a skip down-shift is made by effecting a one-step down-shift a plurality of times, a shift shock occurs each time the one-step down-shift is effected and a period of time required for shifting becomes longer. Therefore, the ride qualities and shift response are degraded.

DISCLOSURE OF THE INVENTION

An object of this invention is to provide a speed change control method for an automatic transmission, which is capable of alleviating a shift shock occurring at the time of a speed change, particularly at the time of a skip down-shift, and capable of shortening a time period required for speed change.

In order to attain the above object, in a speed change control method for an automatic transmission including a main transmission mechanism for effecting a speed-changing operation to establish an arbitrary one of a plurality of speed positions, and a subsidiary transmission mechanism arranged in line, with respect to a power transmission, with the main transmission mechanism, for effecting a speed-changing operation to establish an arbitrary one of a plurality of speed positions, the automatic transmission being operable to establish an arbitrary one of a plurality of shift positions, including first and second shift positions, according to a combination of a speed position established in the main transmission mechanism and a speed position established in the subsidiary transmission mechanism, the speed change control method of the present invention comprises the steps of: (a) starting a speed-changing operation of either one of the main and subsidiary transmission mechanisms when a speed change command for instructing a speed change from the first shift position to the second shift position is output, said speed-changing operation of said either one transmission mechanism establishing only one of a speed position, corresponding to the second shift position, of the main transmission mechanism and a speed position, corresponding to the second shift position, of the subsidiary transmission mechanism; and (b) starting a speed-changing operation of the other of the main and subsidiary transmission mechanisms before said speed-changing operation of said either one transmission mechanism started in said step (a) is completed, said speed-changing operation of said other transmission mechanism establishing the other of said speed position, corresponding to the second shift position, of the main transmission mechanism and said gear position, corresponding to the second shift position, of the subsidiary transmission mechanism. According to this speed change control method, a shift shock caused by a shifting from the first shift position to the second shift position can be alleviated. Further, a time period required for shifting can be shortened, and the response at the time of shifting can be improved.

Preferably, said step (a) includes starting said speed-changing operation of said either one transmission mechanism when a down-shift command for instructing a shifting to an at least two-level lower shift position is output as the speed change command. Said speed-changing operation of said either one transmission mechanism started in the step (a) establishes a third shift position in the automatic transmission. The third shift position is included in said plurality of shift positions permitted to be established in the automatic transmission, and is not established during a shifting from one of said plurality of shift positions permitted to be established in the automatic transmission to a one-level upper or lower shift position. Further, said step (b) includes starting said speed-changing operation of said other transmission mechanism before said third shift position is established. According to this preferred embodiment, a skip down-shift of two or more steps can be smoothly and rapidly effected by way of the third shift position, so that a shift shock caused by the skip down-shift can be alleviated.

Preferably, said speed-changing operation of said either one transmission mechanism started in said step (a) includes releasing a first friction element which is included in the subsidiary transmission mechanism acting as said either one transmission mechanism and which is engaged when the first shift position is established. The third shift position is established when a one-way clutch is locked due to said first friction element being released. The one-way clutch is included in the subsidiary transmission mechanism, and is arranged in line, in respect of power transmission, with the first friction element. According to this preferred embodiment, since the third shift position can be established by the locking of the one-way clutch, the determination of synchronization is unnecessary in establishing the third shift position. Therefore, the speed change control can be simplified.

Preferably, said speed-changing operation of said either one transmission mechanism started in said step (a) includes engaging a second friction element after the one-way clutch starts to be locked. The second friction element is included in the subsidiary transmission mechanism, and is arranged in parallel, with respect to a power transmission, to the one-way clutch. According to this preferred embodiment, the speed change control for one of the main and subsidiary transmission mechanisms can be simplified, and at the same time the speed-changing operation of the one transmission mechanism can be effected with high reliability.

Preferably, said speed-changing operation of said other transmission mechanism started in said step (b) includes detecting a rotation speed of a turbine of a fluid coupling which is connected to an input side of the main transmission mechanism acting as said other transmission mechanism, and starting that speed-changing operation of the main transmission mechanism which establishes the speed position, corresponding to the second shift position, of the main transmission mechanism, when the rotation speed of the turbine has reached a speed which is a predetermined speed lower than a turbine speed to be reached at a moment the third shift position is established. According to this preferred embodiment, the start timing of the speed-changing operation of the main transmission mechanism acting as the other transmission mechanism can be rationalized, so that the shifting operation can be smoothly effected.

Preferably, said speed-changing operation of said other transmission mechanism started in said step (b) includes reducing an engagement force of a third friction element to a predetermined value before said speed-changing operation of said either one transmission mechanism started in said step (a) is completed. The third friction element is included in said other transmission mechanism, and is engaged while the first shift position is established. According to this preferred embodiment, a shift shock can be further alleviated, and a time period required for shifting can be further reduced.

Preferably, said step (a) includes starting said speed-changing operation of said either one transmission mechanism when a down-shift command for instructing a shifting to an at least two-level lower shift position is output as the speed change command. Said speed-changing operation of said other transmission mechanism includes setting said predetermined value to such a value that the third friction element can start to slide at a moment when said speed-changing operation of said either one transmission mechanism is completed. According to this preferred embodiment, a shift shock can be further alleviated, and a time period required for shifting can be further reduced.

Preferably, said speed-changing operation of said other transmission mechanism includes gradually further reducing the engagement force of the third friction element after the engagement force thereof is reduced to the predetermined value. According to this preferred embodiment, even in a case where the operation characteristic of the automatic transmission has an individual difference, the engagement force of the third friction element at the time of completion of the speed-changing operation of said one transmission mechanism can be rationalized, so that a shift shock can be further alleviated and a time period required for shifting can be further reduced.

Preferably, said speed-changing operation of said other transmission mechanism includes gradually reducing the engagement force of the third friction element to such a value that the third friction element may start to slide at a moment when said speed-changing operation of said either one transmission mechanism is completed. According to this preferred embodiment, the engagement force of the third friction element at the time of completion of the speed-changing operation of said one transmission mechanism can be further rationalized.

Preferably, said speed-changing operation of said other transmission mechanism includes detecting an input torque supplied to the automatic transmission, and setting said predetermined value based on a detected value of the input torque. According to this preferred embodiment, the engagement force of the third friction element at the time of completion of the speed-changing operation of said one transmission mechanism can be rationalized.

Preferably, said speed-changing operation of said other transmission mechanism includes reducing the engagement force of the third friction element after a predetermined time period has elapsed from a moment when a speed change command was output. According to this preferred embodiment, the engagement force of the third friction element at the time of completion of the speed-changing operation of said one transmission mechanism can be rationalized.

BEST MODE OF CARRYING OUT THE INVENTION

There will now be described in detail a speed change control method for an automotive automatic transmission according to a first embodiment of this invention with reference to the accompanying drawings.

Figure 1:
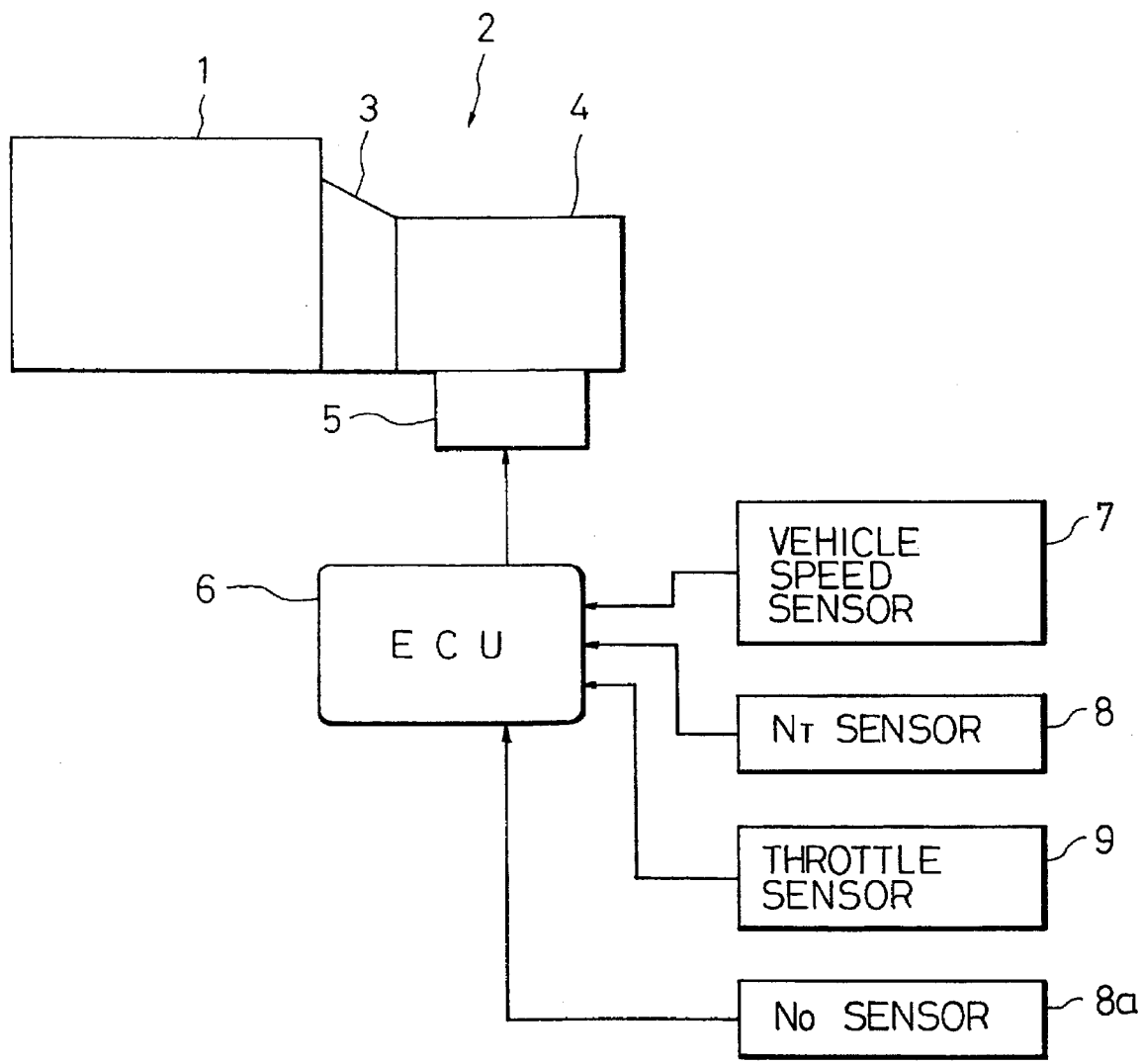
FIG. 1 is a schematic diagram showing a speed change control apparatus for embodying a speed change control method according to a first embodiment of this invention, together with an automatic transmission.

Referring to FIG. 1, an automatic transmission 2 which is comprised of a torque converter 3, auxiliary transmission 4 and hydraulic controller 5, is drivingly coupled with the crank shaft (not shown) of an engine 1 to transmit an output torque of the engine 1 to driving wheels (not shown) of a vehicle. The auxiliary transmission 4 contains a plurality of sets of planetary speeds and hydraulic friction engaging elements such as hydraulic clutches and hydraulic brakes. Further, a hydraulic circuit which is not shown in the drawing is formed in the hydraulic controller 5, and pressurized operating oil from a hydraulic pump (not shown) driven by the crank shaft of the engine 1 is supplied to the hydraulic circuit. Further, in various portions of the hydraulic circuit, a plurality of electromagnetic valves (not shown) duty-driven by an ECU 6 are disposed. The electromagnetic valves are operated under control of the ECU 6 to control the supply of oil to the hydraulic friction engaging elements of the transmission 4 so as to establish a desired one of a plurality of shift positions, for example, five forward speeds and one reverse speed, in the transmission 4.

The ECU 6 has an input/output device which is not shown in the drawing, memory device (non-volatile RAM, ROM or the like), central processing unit (CPU), timer counter and the like. To the input side of the ECU 6, a vehicle speed sensor 7 for detecting the traveling speed V of the vehicle, an $N_T$ sensor 8 for detecting the rotation speed $N_T$ of the turbine, that is, the rotation speed of the transmission input shaft, a throttle sensor (engine load detecting means) 9 for outputting a voltage $V_{TH}$ indicating the throttle valve opening degree θ, and an $N_O$ sensor 8a for detecting the rotation speed $N_O$ of the transmission output shaft are connected. The ECU 6 cooperates with the sensors 7, 8, 8a, 9 to form a speed change control apparatus of this embodiment. Further, the ECU 6 is connected to various other sensors and switches such as an inhibitor switch for detecting the shift position and an $N_E$ sensor for detecting an engine rotation speed $N_E$, in addition to the sensors 7 to 9. Since these elements are not directly related to this embodiment, they are not shown in the drawing.

Figure 2:
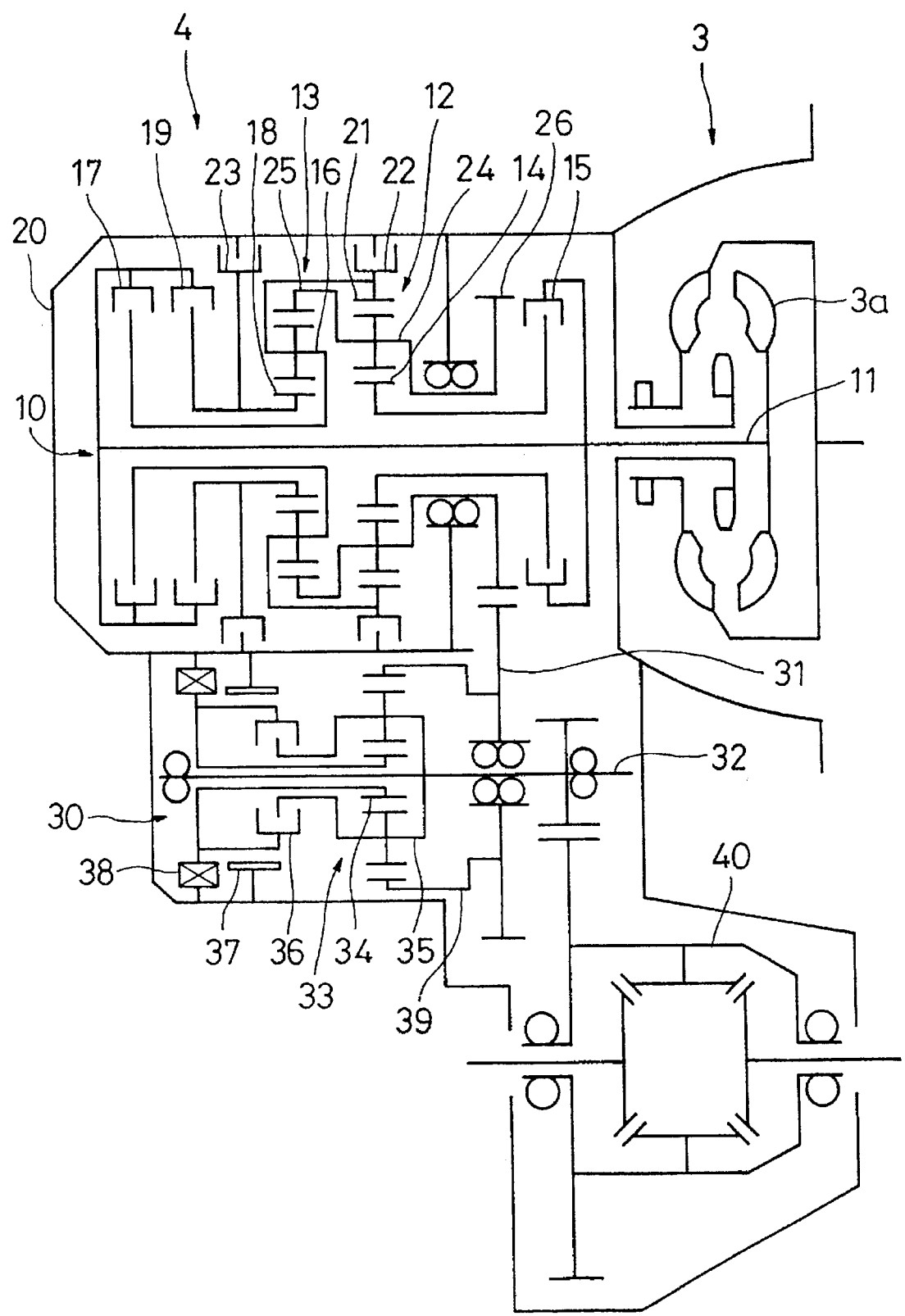
FIG. 2 is a skeleton diagram showing the speed train of an auxiliary transmission shown in FIG. 1.

Referring to FIG. 2, the auxiliary transmission 4 includes a main transmission mechanism 10, and a subsidiary transmission mechanism 30 coupled in line, from the viewpoint of engine torque transmission, with the main transmission mechanism 10. The main transmission mechanism 10 includes an input shaft 11 mounted on a turbine 3a of the torque converter 3 for rotation in unison with the turbine, and first and second planetary gears 12, 13 supported on the input shaft 11. Input sides of first, second and third clutches 15, 17, 19 are drivingly coupled to the input shaft 11. When operating oil is supplied to an engaging piston (not shown) of each of the clutches 15, 17, 19, the input and output sides of the clutch are engaged, and when operating oil is discharged from the piston of the clutch, the engagement of the input and output sides thereof is released. The output sides of the first, second and third clutches 15, 17, 19 are respectively coupled with a sun gear 14 of the first planetary gear 12, a pinion carrier 16 of the second planetary gear 13, and a sun speed 18 of the second planetary gear 13.

Therefore, when the first clutch 15 is engaged, the sun gear 14 and the input shaft 11 are drivingly coupled to each other, when the second clutch 17 is engaged, the pinion carrier 16 and the input shaft 11 are drivingly coupled to each other, and when the third clutch 19 is engaged, the sun gear 18 and the input shaft 11 are drivingly coupled to each other.

Further, in the main transmission mechanism 10, first and second brakes 22, 23 each containing an engaging servo device (not shown) are mounted to a casing 20 of the transmission 4. The first brake 22 is set into the engaged state to fix an internal gear 21 of the first planetary gear 12 and set the same into the unrotatable state when operating oil is supplied to the servo device thereof and permit rotation of the internal gear 21 when the operating oil is discharged from the servo device thereof. Likewise, the second brake 23 fixes the sun gear 18 of the second planetary gear 13 when operating oil is supplied and permits rotation of the sun gear 18 when the operating oil is discharged. The internal gear 21 of the first planetary gear 12 and the pinion carrier 16 of the second planetary gear 13 are arranged to rotate together, the pinion carrier 24 of the first planetary gear 12 and the internal carrier 25 of the second planetary gear 13 are arranged to rotate together, and the pinion carrier 24 is directly coupled to the drive speed 26. Rotation of the input shaft 11 is transmitted to a driven speed 31 on the subsidiary transmission mechanism 30 side via the planetary gears 12, 13 and drive gear 26.

The subsidiary transmission mechanism 30 includes a counter shaft 32, and a third planetary gear 33 and a fourth clutch 36 which are supported by the counter shaft 32. The input and output sides of the fourth clutch 36 are engaged when operating oil is supplied to an engaging piston (not shown) thereof, and the engagement of the input and output sides thereof is released when operating oil is discharged. The third planetary gear 33 includes a sun gear 34 disposed for rotation in unison with the output side of the fourth clutch 36, a pinion carrier 35 disposed for rotation in unison with the input side of the fourth clutch 36, and an internal gear 39 disposed for rotation in unison with the driven gear 31. The sun gear 34 and the pinion carrier 35 are coupled together when the fourth clutch 36 is engaged.

Further, the subsidiary transmission mechanism 30 includes a third brake 37 mounted on the casing 20 of the transmission 4 to fix the sun gear 34, and a one-way clutch (O/W clutch) 38 mounted on the casing 20 in parallel, with respect to engine torque transmission, with the third brake 37. The one-way clutch 38 locks the sun gear 34 to prevent rotation of the sun gear 34 in the driving direction when the engagement of the fourth clutch 36 is released to release the engagement between the one-way clutch 38 and the pinion gear 35.

Then, rotation of the driven gear 31 caused by rotation of the input shaft 11 of the main transmission mechanism 10 is transmitted to the counter shaft 32 via the third planetary gear 33 and is further transmitted from the counter shaft 32 to a differential carrier 40.

In the automatic transmission 2 of this embodiment, as indicated in the table 1, a desired one of a plurality of shift positions including the first gear to fifth gear is established by controlling the engagement/disengagement of the first to fourth clutches 15, 17, 19, 36 and the first to third brakes 22, 23, 37 which are friction engaging elements. In the table 1, a mark ○ indicates the engaging state of each clutch or brake and a mark Δ indicates the locking state of the one-way clutch 38.

TABLE 1

| FRICTION ENGAGING ELEMENT | SHIFT POSITION | | | | | | | |
|---|---|---|---|---|---|---|---|---|
| | 1ST | 2ND | 3RD | 4TH | 5TH | R | N, P | 4TH |
| MAIN TRANS. MECH. | | | | | | | | |
| 1ST CLUTCH 15 | ○ | ○ | ○ | ○ | | | | |
| 2ND CLUTCH 17 | | | ○ | ○ | ○ | | | ○ |
| 3RD CLUTCH 19 | | | | | | ○ | | |
| 1ST BRAKE 22 | ○ | | | | | ○ | ○ | |
| 2ND BRAKE 23 | | ○ | | | ○ | | | ○ |
| SUB TRANS. MECH. | | | | | | | | |
| 4TH CLUTCH 36 | | | | ○ | ○ | | | |
| 3RD BRAKE 37 | ○ | ○ | ○ | | | ○ | ○ | ○ |
| O/W CLUTCH 38 | Δ | Δ | Δ | | | | | Δ |

As indicated in the table 1, in order to establish a desired shift position in the automatic transmission 2, the friction engaging elements associated with the desired shift position are engaged, so that corresponding ones of those gear-changing elements (rotation member and fixed member)

which contribute to the power transmission in the shift position to be established are engaged.

For example, in order to establish the fifth speed (more generally, first shift position), the second clutch 17, the second brake 23 and the fourth clutch 36 which are the friction elements associated with the fifth speed are engaged. By the engagement of the second clutch 17, the input shaft 11 and the pinion carrier 16 which make a pair of speed-changing elements associated with the fifth speed are engaged. Further, by the engagement of the second brake 23, the sun gear 18 and the casing 20 which make a different pair of speed-changing elements are engaged, and by the engagement of the fourth clutch 36, the sun gear 34 and the pinion carrier 35 which make a still different pair of speed-changing elements are engaged.

Further, in order to establish the third speed (more generally, second shift position), the first clutch 15, the second clutch 17 and the third brake 37 are engaged. In this embodiment, for the down-shift from the fifth speed to the third speed, that shift position (hereinafter referred to as 4'th speed) which is not used in a normal shifting operation, that is, in a down-shift of one step or up-shift of one step, is used in the process of the down-shift. To establish the 4'th speed, the second clutch 17, second brake 23 and third brake 37 are engaged.

Therefore, in the down-shift from the fifth speed to the 4'th speed, the fourth clutch 36 is released and the third brake 37 is engaged. Since an increase in the speed of the sun gear 34 can be prevented by the one-way clutch 38 even if the engagement of the third brake 37 is not completed, there is no possibility that the sun gear 38 is excessively rotated even at the time of power-ON or at the time of step-on of the accelerator pedal, so that the 4'th speed is established.

Further, in the down-shift from the 4'th speed to the third gear, the second brake 23 is released and the first clutch 15 is engaged. Thus, in the skip down-shift from the fifth speed to the third speed, the function of the one-way clutch 38 can be utilized by using the 4'th speed which is not used in the normal shifting operation, as distinct from the conventional skip down-shift from the fifth speed to the third speed by way of the fourth speed, in which the function of the clutch 38 is not utilized.

Next, the speed change control procedure executed by the ECU 6 at the time of down-shift from the fifth speed to the third speed is explained with reference to the flowchart of FIGS. 3 to 6 and the graph of FIG. 7. The graph of FIG. 7 shows a change in the turbine rotation speed $N_T$ at the time of shift-down from the fifth speed to the third speed with the elapse of time represented along the abscissa.

Figure 8:
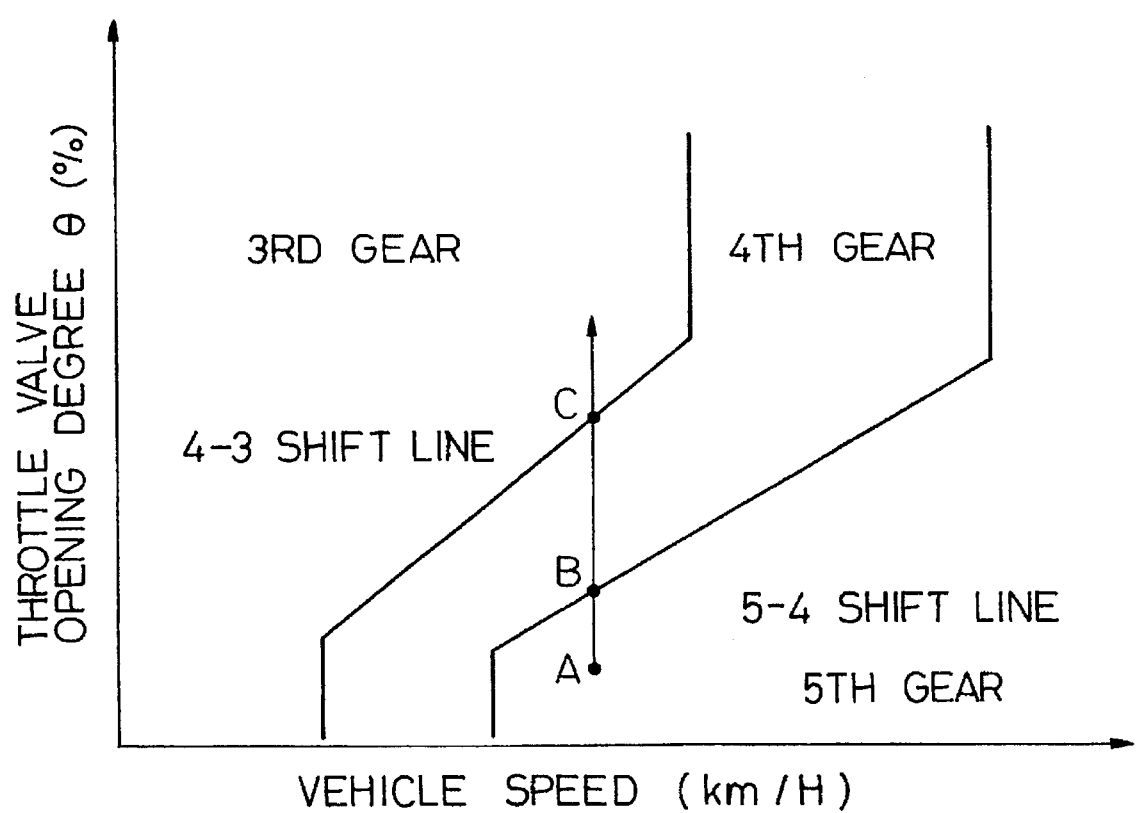
FIG. 8 is a diagram showing a shift map determined as a function of vehicle speed and throttle valve opening degree.

In relation to the speed change control operation, the ECU 6 periodically determines, in the optimum shift position determining routine which is not shown, whether or not the throttle valve opening degree θ traverses the shift line by use of the shift map of FIG. 8 and on the basis of the output of the throttle sensor 9.

Figure 3:
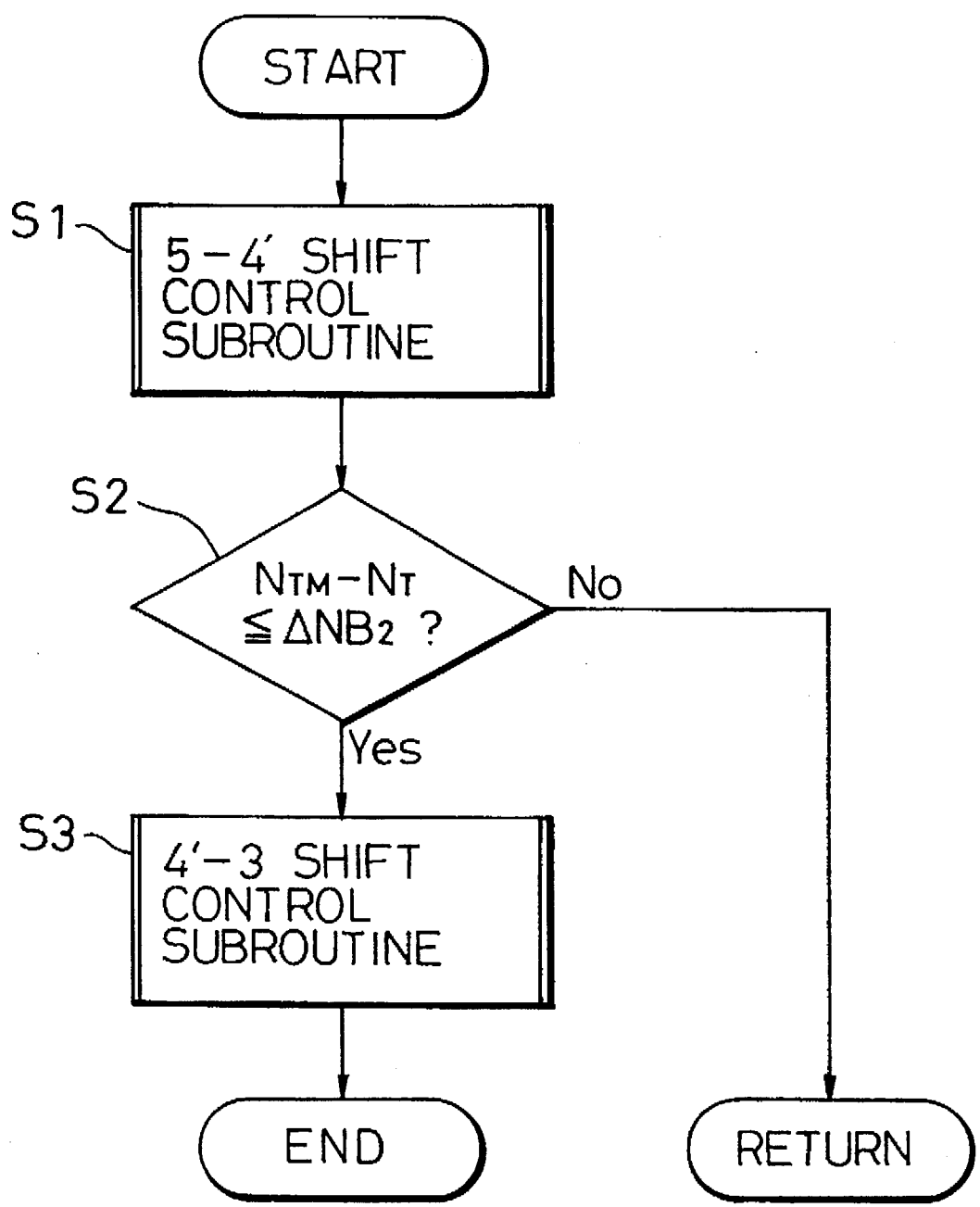
FIG. 3 is a flowchart showing a 5-3 shift control subroutine executed by an electronic control unit (ECU) shown in FIG. 1.
Figure 7:
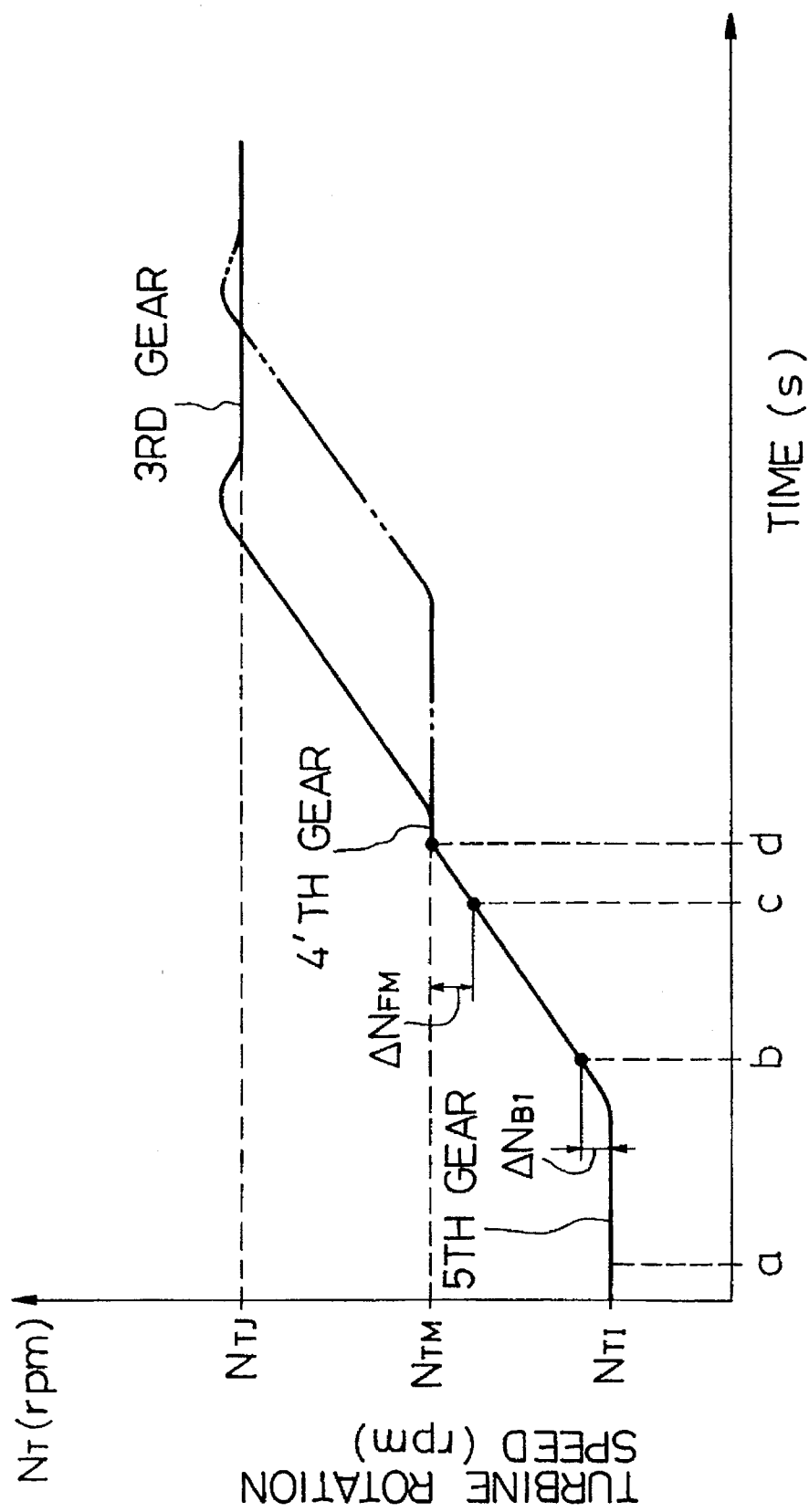
FIG. 7 is a graph showing a change in the turbine rotation speed during the 5-3 shifting.

When the driver steps on the accelerator pedal while the car is running in the fifth speed and if it is determined in the optimum shift position determining routine that the throttle valve opening degree θ is changed from the point A to the point C in FIG. 8 and traverses the 4–3 shift line, a 5–3 shift command is output and the 5–3 shift control subroutine of FIG. 3 is started (at time a of FIG. 7). The subroutine is executed at a predetermined control interval (for example, 5 ms).

In the θ subroutine of FIG. 3, the ECU 6 executes the 5–4' shift control subroutine in the step S1. The subroutine is shown in detail in FIG. 4.

Figure 4:
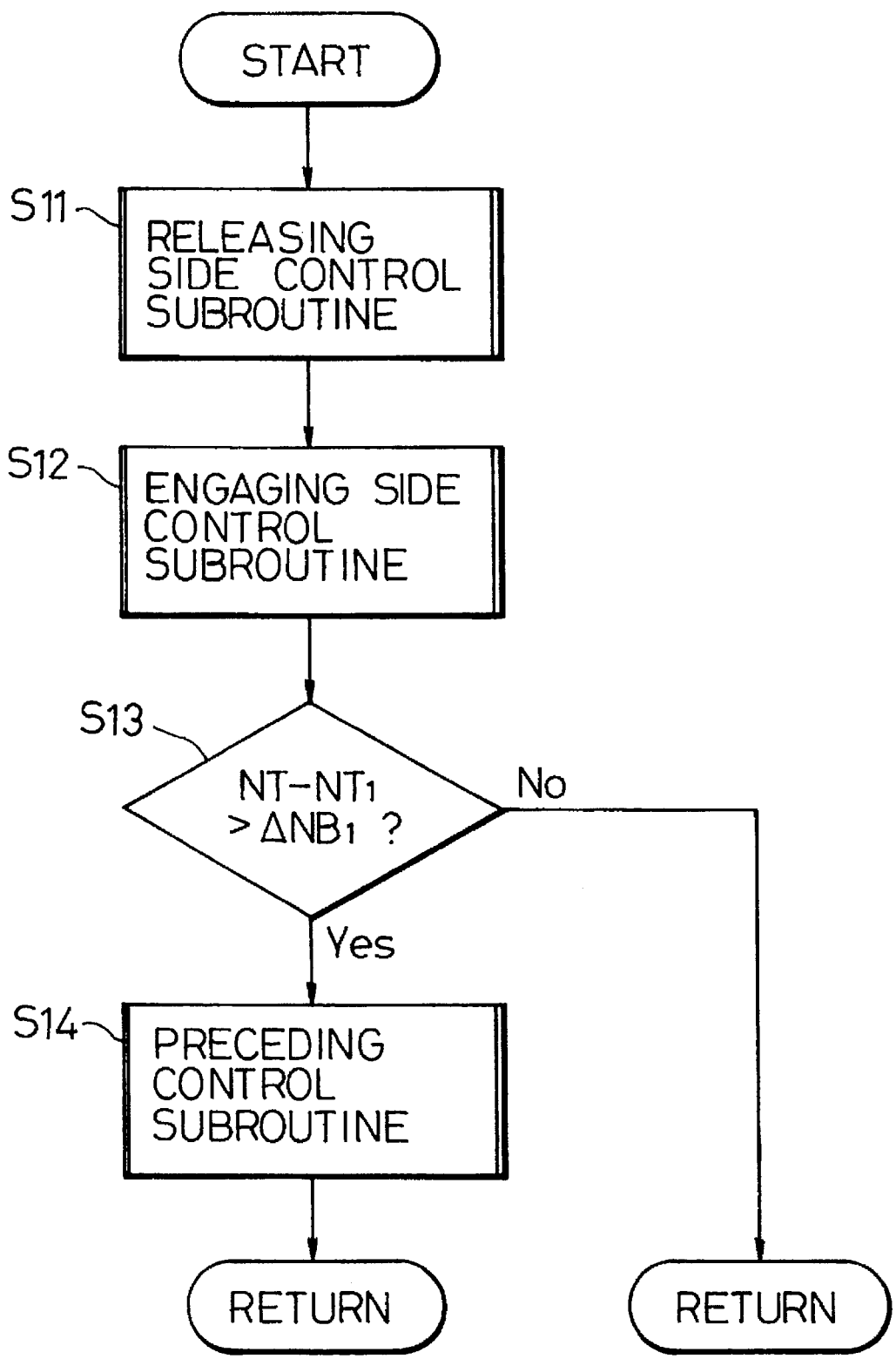
FIG. 4 is a flowchart showing in detail a 5-4' shift control subroutine forming part of the 5-3 shift control subroutine shown in FIG. 3.

In the 5–4' shift control subroutine of FIG. 4, the releasing side control subroutine for releasing the fourth clutch 36 of the subsidiary transmission mechanism 30 is first executed in the step S11, the fourth clutch 36 being a friction engaging element corresponding to the releasing side speed-changing element in the 5–4' shifting process (releasing side speed-changing element on the fifth-speed side). More specifically, the valve opening duty ratio of the electromagnetic valve associated with supply/discharge of operating oil for the fourth clutch 36 is controlled to discharge the operating oil from the fourth clutch 36.

In the next step S12, the engaging side control subroutine for engaging the third brake 37 is executed, which brake is a friction engaging element corresponding to the engaging side speed-changing element in the 5–4' shifting process (engaging side speed-changing element on the 4'th-speed side). More specifically, the duty ratio of the electromagnetic valve associated with supply/discharge of operating oil for the third brake 37 is controlled to supply the operating oil to the third brake 37.

In the step S13, the output of the $N_T$ sensor 8 indicating the present turbine rotation speed $N_T$ and the output of the $N_O$ sensor 8a indicating the rotation speed of the transmission output shaft are read, the $N_O$ sensor output is multiplied by a speed ratio to thereby calculate the turbine rotation speed indicating the establishment of the fifth speed (hereinafter referred to as a fifth-speed in-gear rotation speed (fifth-speed synchronous rotation speed) $N_{TI}$), and a 5–4' shift starting threshold value ΔNB1 stored in the memory device of the ECU 6 is read out therefrom. Then, a rotation speed difference ($N_T$–$N_{TI}$) is calculated by subtracting the fifth-speed in-gear rotation speed $N_{TI}$ from the present turbine rotation speed $N_T$, and whether the rotation speed difference ($N_T$–$N_{TI}$) is larger than the 5–4' shift starting threshold value ΔNB1 is checked to determine whether the down-shift to the 4'th gear is started or not.

If the result of determination in the step S13 is "NO", execution of the 5–3 shift control subroutine (FIG. 3) in the present cycle is completed, and after this, the same subroutine is started again when the control interval has passed. Therefore, if the rotation speed difference ($N_T$–$N_{TI}$) is not larger than the threshold value ΔNB1, the releasing side control subroutine (step S11) and the engaging side control subroutine (step S12) for 5–4' shifting are carried out.

In this embodiment, since the 4'th gear is established by use of the one-way clutch in the 5–4' shifting process, the duty ratio may be controlled to simply release the fourth clutch 36 which is the releasing side speed-changing element in the 5–4' shifting process (change the duty ratio from 100% to 0%) and simply engage the third brake 37 which is the engaging side speed-changing element in the 5–4' shifting process and which is arranged in parallel with the one-way clutch (change the duty ratio from 0% to 100%), as shown in FIG. 4.

In a transmission having no one-way clutch unlike this embodiment, the supply/discharge of operating oil effected by the duty control of the electromagnetic valve in the steps S11 and S12 may be carried out such that the turbine rotation speed $N_T$ will rise at a target changing rate from the fifth-gear in-gear rotation speed $N_{TI}$ to that target rotation speed (hereinafter referred to as a 4'th-speed in-gear rotation speed (4'th-speed synchronous rotation speed) $N_{TM}$) which indicates the establishment of the 4'th speed. This type of duty control itself is well known in the art, and hence a detail explanation thereof is omitted.

As the operating oil is discharged from the fourth clutch 36, the fourth clutch 36 is gradually released. As a result, engagement between the sun speed 34 and the pinion carrier 35 of the third planetary gear 33 is gradually released. During this time, since the accelerator pedal is stepped on, and therefore, the engine 1 is set in the power-ON state, so that the sun gear 34 tends to increase its speed according to the release of the fourth clutch 36, but the speed increasing action is prevented by the action of the one-way clutch 38. Further, as the operating oil is supplied to the third brake 37, the third brake 37 is gradually engaged.

In the step S13 of the succeeding control cycle, if the condition that $N_T-N_{TI}>\Delta NB1$ is satisfied and it is determined that the down-shift to the 4'th speed is started (time point b in FIG. 7), the control flow proceeds to the step S14. In the step S14, the preceding control subroutine for starting the releasing control for the second brake 23 is executed prior to the establishment of the 4'th speed, the brake 23 being the friction engaging element corresponding to the releasing side speed-changing element in the 4'–3 shifting process (releasing side speed-changing element on the 4'th-speed side). The same subroutine is shown in FIG. 5 in detail.

Figure 5:
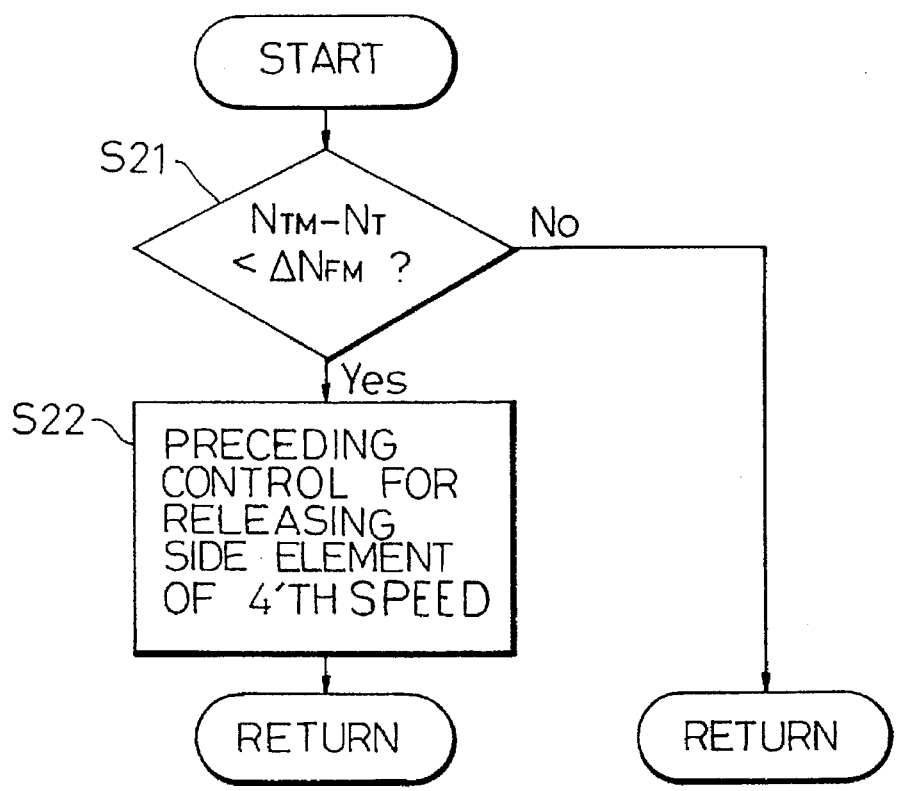
FIG. 5 is a flowchart showing in detail a preceding control subroutine forming part of the 5-4' shift control subroutine shown in FIG. 4.

In the preceding control subroutine of FIG. 5, the output of the $N_T$ sensor 8 and the output of the $N_O$ sensor are read in the step S21, the 4'th-gear in-gear rotation speed $N_{TM}$ is calculated by multiplying the $N_O$ sensor output by the speed ratio, and the preceding control starting threshold value $\Delta N_{FM}$ previously stored in the memory device is read out therefrom. The threshold value $\Delta N_{FM}$ is set to a value (for example, 100 rpm) larger than the threshold value $\Delta N_{B2}$ (for example, 40 rpm) for determination of 4'th speed synchronization. Next, a rotation speed difference $(N_{TM-NT})$ is derived by subtracting the present turbine rotation speed $N_T$ from the 4'th-speed in-gear rotation speed $N_{TM}$, and whether or not the rotation speed difference is smaller than the preceding control starting threshold value $\Delta N_{FM}$ is checked.

If the result of determination in the step S21 is "NO", execution of the 5–3 shift control subroutine (FIG. 3) in the present cycle is completed, and after this, the same subroutine is started again when the control interval has passed. Therefore, if the rotation speed difference $(N_{TM-NT})$ is equal to or larger than the preceding control starting threshold value $\Delta N_{FM}$, only the releasing side control subroutine and the engaging side control subroutine (steps S11, S12) for 5–4' shifting are effected.

In the step S21 of the succeeding control cycle, if the condition that $N_{TM-NT}<\Delta N_{FM}$ is satisfied and hence the preceding control starting condition is satisfied (time c in FIG. 7), a control operation for releasing the second brake 23 of the main transmission 10 which is the friction engaging element corresponding to the releasing side speed-changing element in the 4'th gear is started before the 4'th speed is established. In the preceding control operation, the electromagnetic valve for supplying or discharging operating oil to or from the second brake 23 is duty-controlled to discharge operating oil from the second brake 23 so as to increase the turbine rotation speed $N_T$ from the 4'th-speed in-gear rotation speed $N_{TM}$ to the third-speed in-gear rotation gear $N_{TJ}$ at a target changing rate. As a result, the sun gear 18 of the second planetary speed 13 fixed to the casing is gradually released.

Next, the control flow proceeds to the step S2 of the 5–3 shift control subroutine shown in FIG. 3. In the step S2, the output of the $N_T$ sensor 8 and the output of the $N_O$ sensor are read, the 4'th-speed inspeed rotation speed $N_{TM}$ is calculated by multiplying the $N_O$ sensor output by the speed ratio, and the synchronization determining threshold value $\Delta N_{B2}$ (for example, 40 rpm) previously stored in the memory device is read out therefrom. Next, a rotation speed difference $(N_{TM-NT})$ is derived by subtracting the present turbine rotation speed $N_T$ from the 4'th-speed in-gear rotation speed $N_{TM}$, and whether or not the rotation speed difference is equal to or smaller than the synchronization determining threshold value $\Delta N_{B2}$ is checked to determine whether the 4'th speed is established or not.

If the result of determination in the step S2 is "NO", execution of the speed change control process (FIG. 3) in the present cycle is completed, and the same control process is started again when the control interval has passed. As a result, if the 4'th speed is not yet established after the preceding control operation for releasing the second brake 23 is started, which brake is the friction engaging element corresponding to the releasing side speed-changing element in the 4'th speed, the releasing side control subroutine and the engaging side control subroutine (steps S11, S12) for 5–4' shifting and the preceding control subroutine (step S22) are carried out.

Therefore, during this time, the fourth clutch 36 of the subsidiary transmission mechanism 30 is released and the second brake 23 of the main transmission mechanism 10 is released. However, the operation of releasing the fourth clutch 36 is started at the time of output of the 5–3 shift command, and the operation of releasing the second brake 23 is started when the preceding control starting condition is satisfied. Therefore, the operation of releasing the fourth clutch 36 will be completed before completion of the operation of releasing the second brake 23.

After this, when $N_T$ becomes substantially equal to $N_{TM}$, rotation of the sun speed 34 of the third planetary speed 33 in the driving direction is locked by the one-way clutch 38 of the subsidiary transmission mechanism 30 as described before, so that the one-way clutch 38 carries the driving torque. Therefore, even if the engagement of the third brake 37 is not completed, the 4' speed can be established (time point d in FIG. 7).

In the step S2 of the subroutine of FIG. 3 in the succeeding control cycle, if it is determined that $N_{TM-NT}\leq\Delta N_{B2}$ and hence the 4'th speed is established, the control flow proceeds to the step S3 to execute the 4'–3 shift control subroutine. The same subroutine is shown in FIG. 6 in detail.

Figure 6:
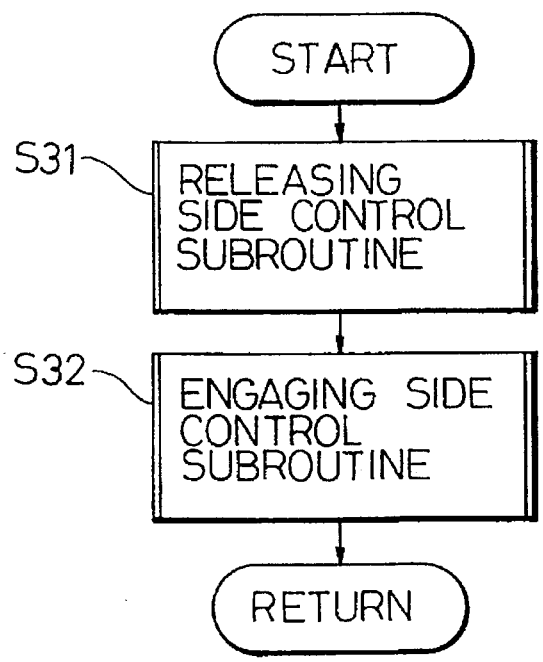
FIG. 6 is a flowchart showing in detail a 4'-3 shift control subroutine forming part of the 5-3 shift control subroutine shown in FIG. 3.

In the 4'–3 shift control subroutine of FIG. 6, the releasing side control subroutine for releasing the second brake 23 of the main transmission mechanism 10 is executed, which brake is the friction engaging element corresponding to the releasing side speed-changing element in the 4'th speed. The control subroutine is executed in the same manner as the preceding control subroutine (S22) which already executed before the establishment of the 4'speed. As a result, the operating oil is gradually discharged from the second brake 23 and the sun speed 18 of the second planetary speed 13 is gradually released.

In the step S32, the engaging side control subroutine for engaging the first clutch 15 of the main transmission mechanism 10 is executed, which clutch is the friction engaging element corresponding to the engaging side speed-changing element in the third speed. That is, the electromagnetic valve associated with supply of hydraulic pressure to the first clutch 15 is duty-controlled so as to supply operating oil to the first clutch 15. As a result, the sun speed 14 of the first planetary speed 12 is brought to be coupled to the input shaft 11. The duty control in the step S31 is effected such that the engagement force of the second brake 23 varies to increase the turbine rotation speed $N_T$ from the 4'th speed in-gear rotation speed $N_{TM}$ to the third-speed in-gear rotation speed $N_{TJ}$ at a target speed changing rate. In the step S32, the control operation is effected to switch the duty ratio from 0% to 100% a preset period before the time of determination of third-speed synchronization.

In the 4'-3 shifting process, since the releasing of the sun speed 18 is effected precedently, the period in which the 4'th speed is maintained is extremely short in comparison with the case of the conventional skip down-shift indicated by a two-dot chain line in FIG. 7. As a result, a shift shock at the time of synchronization of 4'th speed is alleviated and the shift response is enhanced.

Next, a speed change control method for an automatic transmission according to a second embodiment of this invention is explained.

The method of this embodiment is similar to the method of the first embodiment in that the 5-3 down-shift is effected via the 4'th speed, and is different from the latter method in that the engaging force of the second brake, which is the friction engaging element corresponding to the speed-changing element of the main transmission mechanism, is reduced before the 4'th shift position is established, so that a time period required for which the 4'th speed is established is significantly reduced.

The method of this embodiment can be embodied by the use of the speed change control apparatus shown in FIGS. 1 and 2, and hence an explanation for the device is omitted.

The speed change control process executed by the ECU 6 at the time of 5-3 down-shift is explained with reference to the control flow shown in FIGS. 9 to 12 and graphs shown in FIGS. 13 to 17.

In this embodiment, the 5-3 down-shift control is effected in basically the same manner as in the first embodiment, and therefore, the following explanation is partly simplified.

Figure 9:
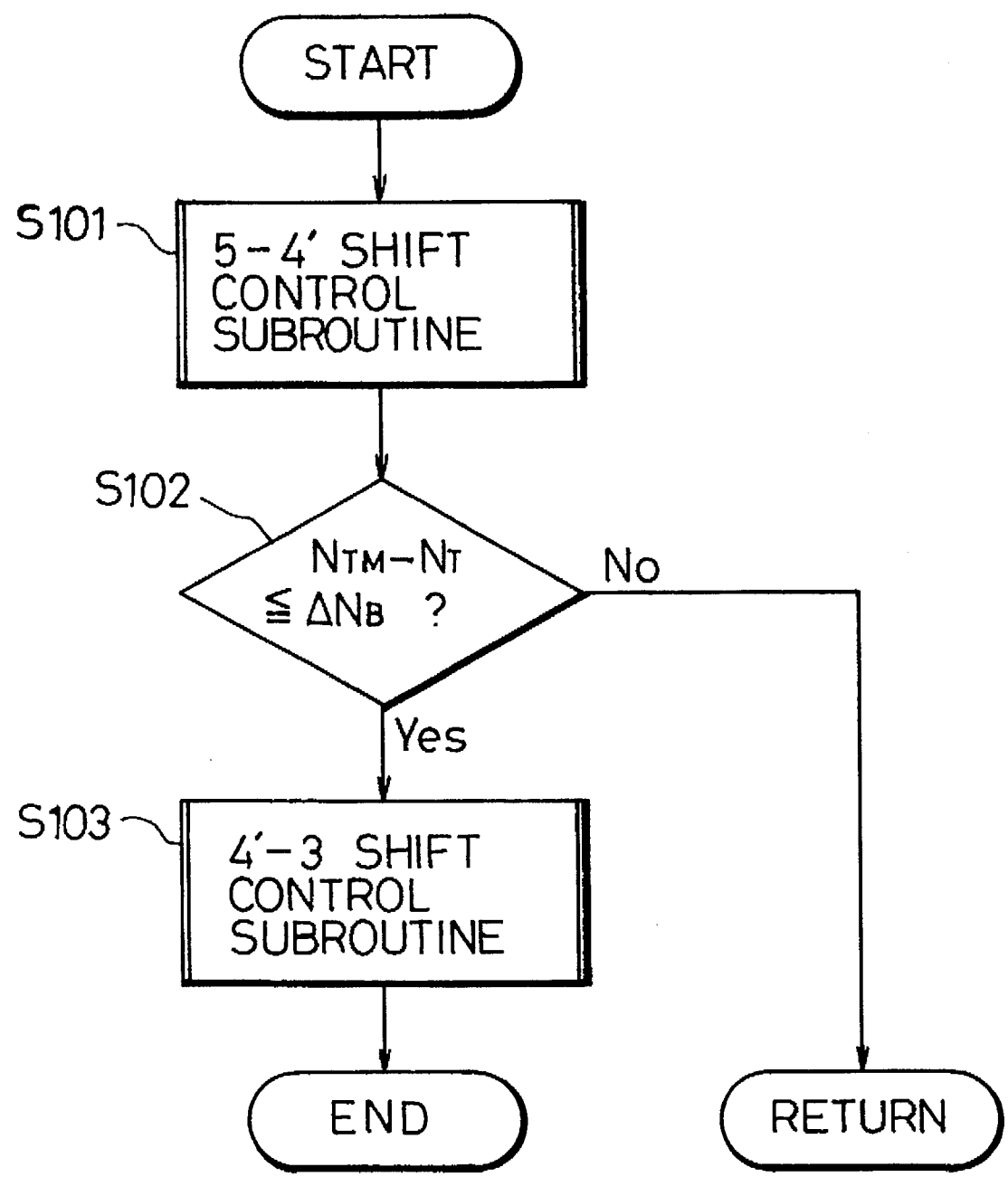
FIG. 9 is a flowchart showing a 5-3 shift control subroutine in a speed change control method according to a second embodiment of this invention.

When the throttle valve opening degree θ traverses the 4-3 shift line, so that a 5-3 shift command is output (point ss in FIGS. 13 to 17), the 5-3 shift control subroutine of FIG. 9 corresponding to the subroutine of FIG. 3 is started. In the step S101 of the subroutine, the 5-4' shift control subroutine is executed.

Figure 10:
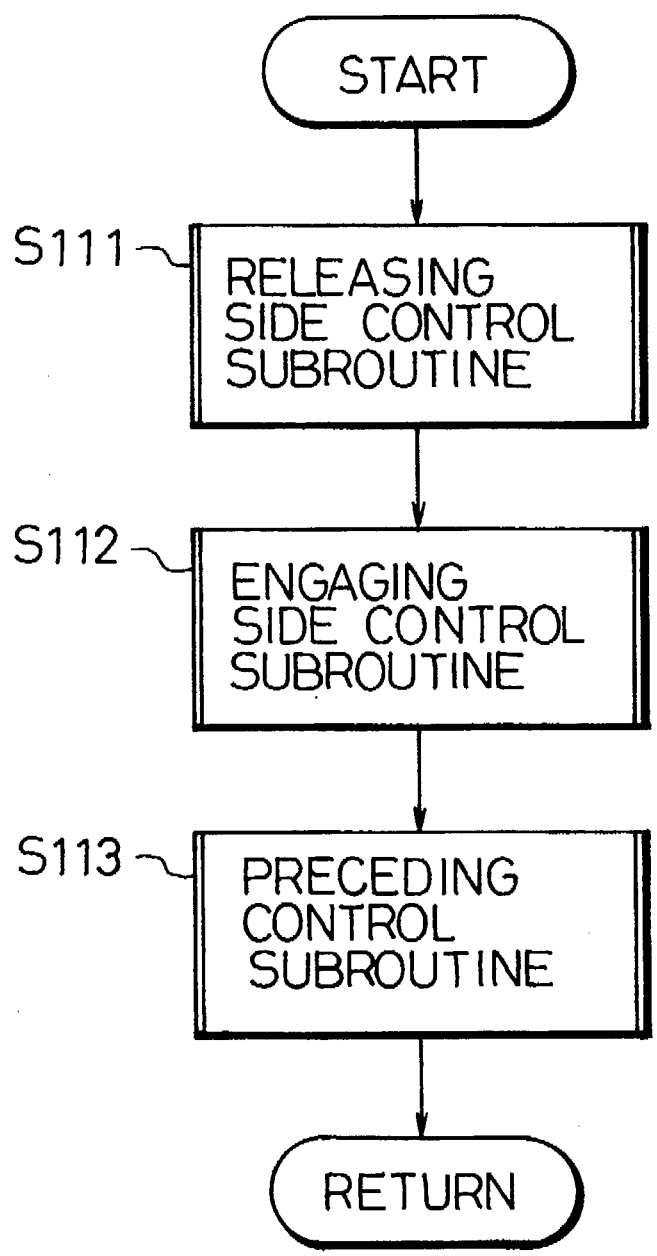
FIG. 10 is a flowchart showing in detail a 5-4' shift control subroutine forming part of the 5-3 shift control subroutine shown in FIG. 9.

In the 5-4' shift control subroutine, a releasing side control subroutine for releasing the fourth clutch, which is the releasing side friction engaging element on the fifth speed side, is executed at the step S111 of FIG. 10 corresponding to the step S11 of FIG. 4, and an engaging side control subroutine for engaging the third brake which is the engaging side friction engaging element on the 4'th speed side is executed at the step S112 corresponding to the step S12 of FIG. 4.

In the step S113, a preceding control subroutine for starting a control operation of releasing the second brake prior to setting of the 4'th speed is effected, which brake is the friction engaging element corresponding to the releasing side speed-changing element on the 4'th speed side. This subroutine is shown in FIG. 11 in detail.

Figure 11:
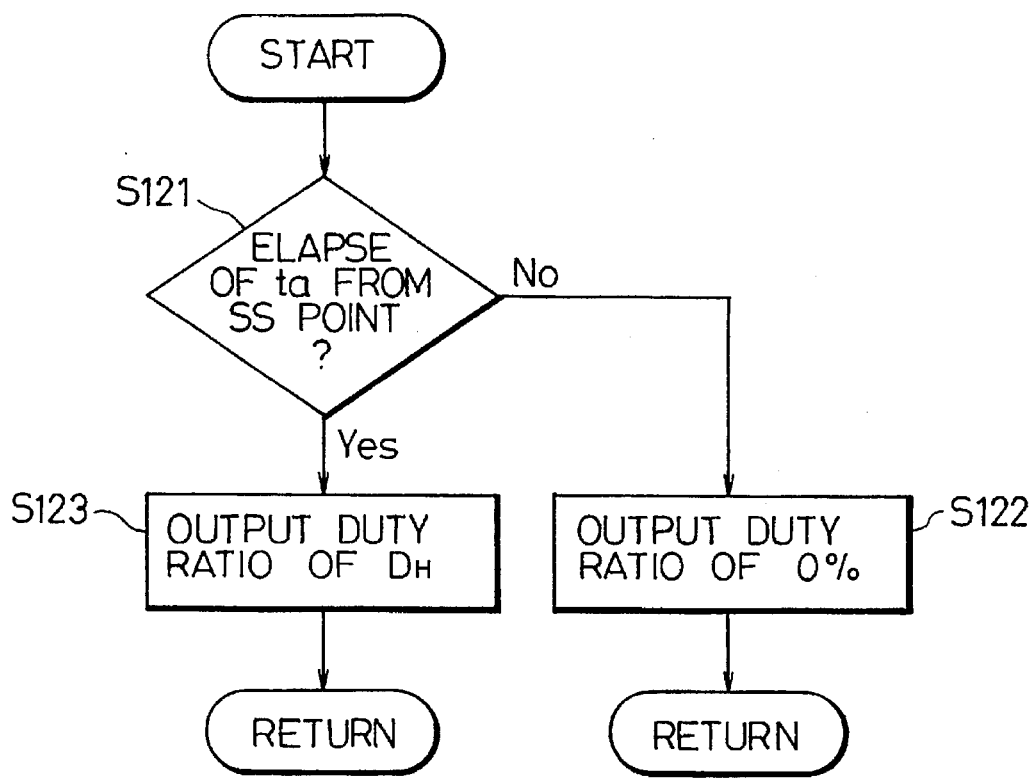
FIG. 11 is a flowchart showing in detail a preceding control subroutine forming part of the subroutine shown in FIG. 10.
Figure 18:
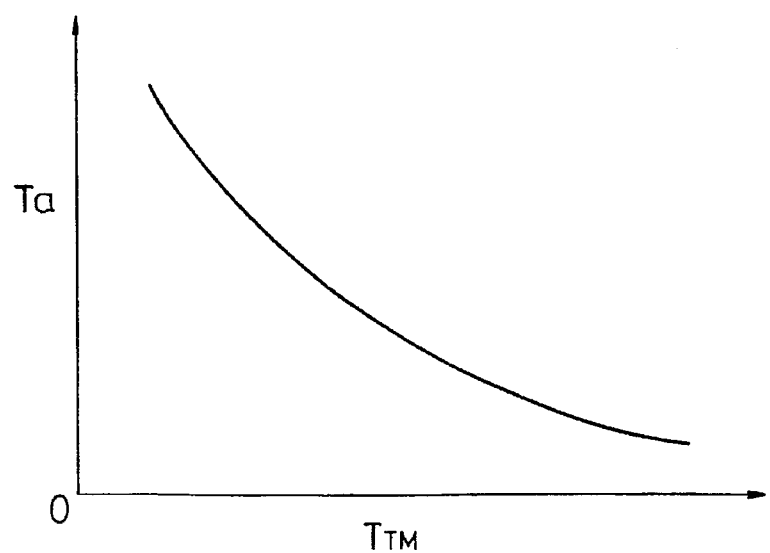
FIG. 18 is a graph showing, by way of example, a predetermined time period $T_a$-turbine torque $T_{TM}$ map referred to in the 5-3 shift control subroutine.

In the preceding control subroutine of FIG. 11, the ECU 6 reads an $N_E$ sensor output indicating the engine rotation speed $N_E$ and the output of $N_O$ sensor 8a indicating the rotation speed $N_O$ of the transmission output shaft, and determines the present speed ratio. As the present speed ratio, an optimum shift position determined in the optimum shift position determining routine described before in relation to the 5-3 down-shift command is used, for example. Then, the torque converter speed ratio e is calculated based on the engine rotation speed $N_E$, the transmission output shaft rotation speed $N_O$ and the present speed ratio, and the turbine torque $T_{TM}$ corresponding to the calculated speed ratio e is derived by referring to a speed ratio e-turbine torque $T_{TM}$ map (not shown) previously stored in the memory device of the ECU 6. Further, a predetermined time period $t_a$ corresponding to the turbine torque $T_{TM}$ is derived by referring to a turbine torque $T_{TM}$-time period $t_a$ map shown, by way of example, in FIG. 18, and whether or not the predetermined time period $t_a$ has elapsed from the time when the 5-3 shift command is output (point ss) is determined.

If it is determined in the step S121 that the predetermined time period $t_a$ has not yet elapsed, and hence the result of determination in the step S121 is "NO", the electromagnetic valve, associated with supply or discharge of operating oil with respect to the second brake 23 which is the friction engaging element corresponding to the releasing side speed-changing element on the 4'th speed side, is driven with the duty ratio 0% in the step S122. Whereupon execution of the 5-3 shift control subroutine of FIG. 3 in the present cycle is completed.

After this, when the control interval has passed, the same subroutine is started again. Therefore, the 5-4' shift control subroutine (the step S101 of FIG. 9 (steps S111 to S113 of FIG. 10)) is successively executed until the predetermined time period $t_a$ has passed from the time when the 5-3 shift command was output.

Figure 14:
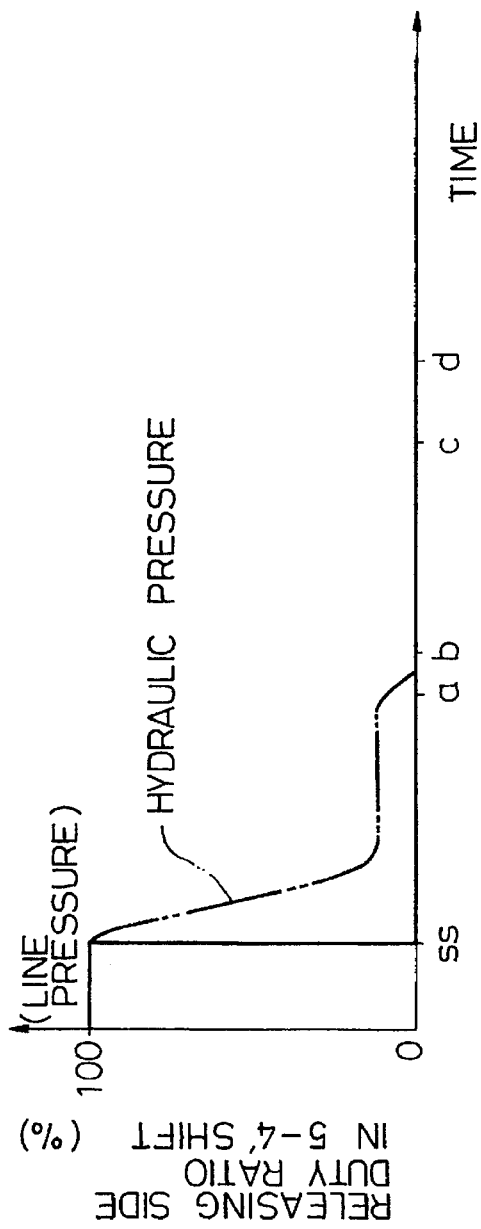
FIG. 14 is a graph showing a change in the valve opening duty ratio of an electromagnetic valve associated with a friction engaging element corresponding to a releasing-side speed-changing element in the 5-4' shifting process.
Figure 15:
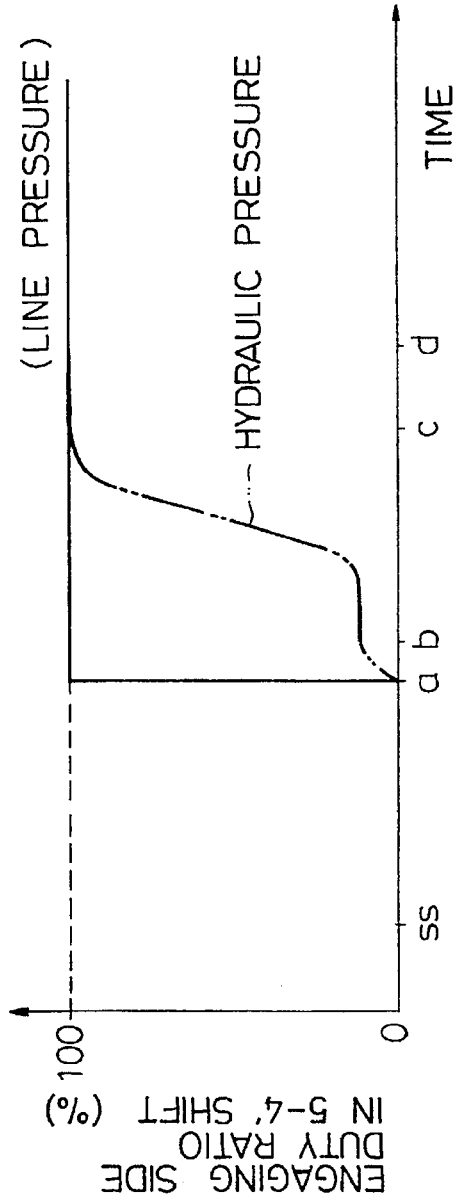
FIG. 15 is a graph showing a change in the valve opening duty ratio of an electromagnetic valve associated with an engaging-side friction engaging element in the 5-4' shifting process.
Figure 16:
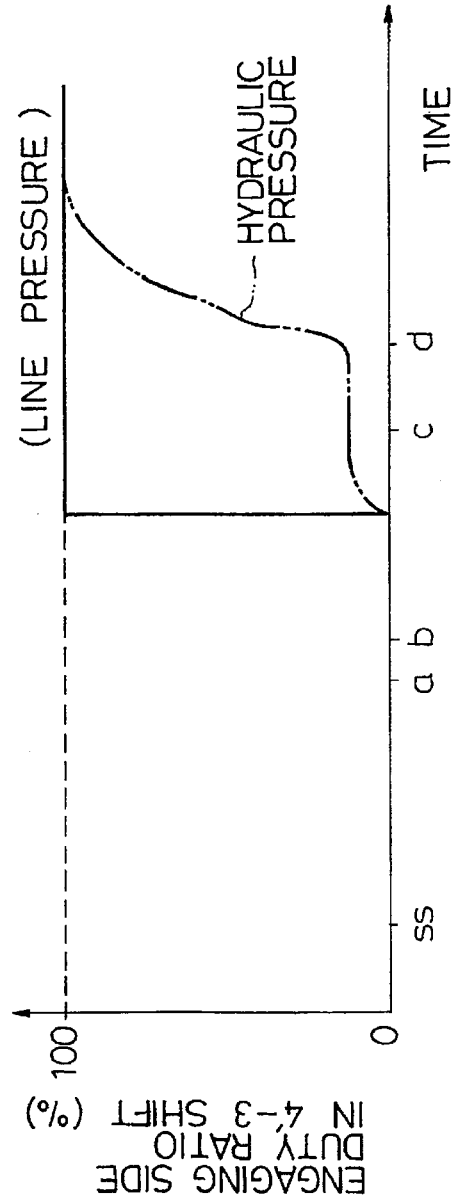
FIG. 16 is a graph showing a change in the valve opening duty ratio of an electromagnetic valve associated with an engaging-side friction engaging element in the 4'-3 shifting process.

As a result of execution of the releasing side and engaging side sub-routines (S111, S112), the duty ratios of the electromagnetic valves respectively associated with the fourth clutch 36 and third brake 37 are controlled as indicated by solid lines in FIGS. 14 and 15 so as to discharge the operating oil from the fourth clutch 36 of the subsidiary transmission mechanism 30 and supply the operating oil to the third brake 37 of the subsidiary transmission mechanism 30 so that the turbine rotation speed $N_T$ increases from the fifth speed in-gear rotation speed $N_{T1}$ to the 4'th-speed in-gear rotation speed $N_{TM}$. Thus, engagement between the pinion carrier 35 and the sun speed 34 of the third planetary speed 37 is gradually released, and the sun speed 34 is gradually fixed to the casing 20. Further, the electromagnetic valve is driven with the duty ratio 0% in the step S122, and hence, the engaging hydraulic pressure for the second brake 23 is rapidly reduced, as indicated by the two-dot chain line in FIG. 17.

Figure 17:
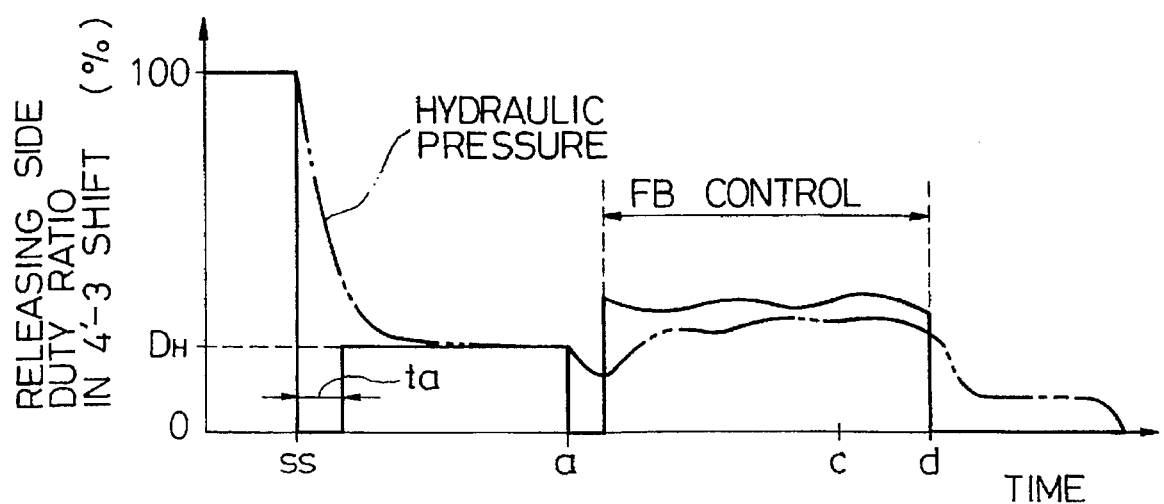
FIG. 17 is a graph showing a change in the valve opening duty ratio of an electromagnetic valve associated with a releasing-side friction engaging element in the 4'-3 shifting process.

In the 5-4' shift control subroutine in the next control cycle, if it is determined in the step S121 that the predetermined time period $t_a$ has elapsed from the time when the 5-3 shift command is output, so that the result of the determination in the step S121 is "YES", the control flow proceeds to the step S123 wherein the electromagnetic valve associated with the second brake 23 is driven with the duty ratio $D_H$, as indicated by the solid line in FIG. 17. The duty ratio $D_H$, which corresponds to the turbine torque $T_{TM}$ detected at intervals of a preset period of time in the 5-4' shifting process, is set to such a value that the second brake 23 will not slide during the 5-4' shifting process and start to slide in response to a rapid increase in the input torque at the time when the 4'th-speed in-gear is achieved.

Next, the control flow proceeds to the step S102 of FIG. 9. In the step S102, whether a difference $(N_{TM}-N_T)$ between the 4'th-speed in-gear rotation speed $N_{TM}$ and the present turbine rotation speed $N_T$ becomes less than a 4'th speed synchronization determining threshold value AN B (for example, 40 rpm) or not is determined.

If the result of determination in the step S102 is "NO", execution of the 5-3 shift control subroutine in the present cycle is completed, and the same subroutine is started after the control interval has elapsed. Therefore, the 5–4' shift control subroutine (the step S101 of FIG. 9 (steps S111 to S113 of FIG. 10)) is successively executed until the turbine rotation speed $N_T$ becomes close to the 4'-th in-gear rotation speed $N_{TM}$. In the step S123 constructing part of the step S113, the electromagnetic valve associated with the second brake 23 is driven with the duty ratio $D_H$. As a result, the hydraulic pressure for engagement of the second brake 23 is balanced at a preset value as indicated by the two-dot chain line in FIG. 17.

Thus, in the 5–4' shifting process, since the releasing control for the fourth clutch 36 and the engaging control for the third brake 37 are carried out while the engaging hydraulic pressure of preset value which prevents the second brake 23 from sliding is being supplied to the second brake 23, release of the fourth clutch 36 and engaging of the third brake 37 will be sequentially completed.

It should be noted here that the one-way clutch 38 is locked so that the 4'th speed is established when release of the fourth clutch 36 is completed even if engagement of the third brake 37 is not completed since the one-way clutch 38 is arranged in parallel to the third brake 37 in the subsidiary transmission mechanism 30. Therefore, in the 5–4' shift, it is only necessary to release the fourth clutch 36, and the third brake 37 may be held when establishment of the 4'th speed is detected.

In the 5–3 shift control subroutine of FIG. 9, if it is determined in the step S102 that the condition that $N_{TM} - N_T \leq \Delta N_B$ is satisfied, and therefore, it is determined that the 4'th speed has been established (point a in FIG. 13), the control flow proceeds to the step S103 wherein a 4'–3 shift control subroutine is executed.

Figure 12:
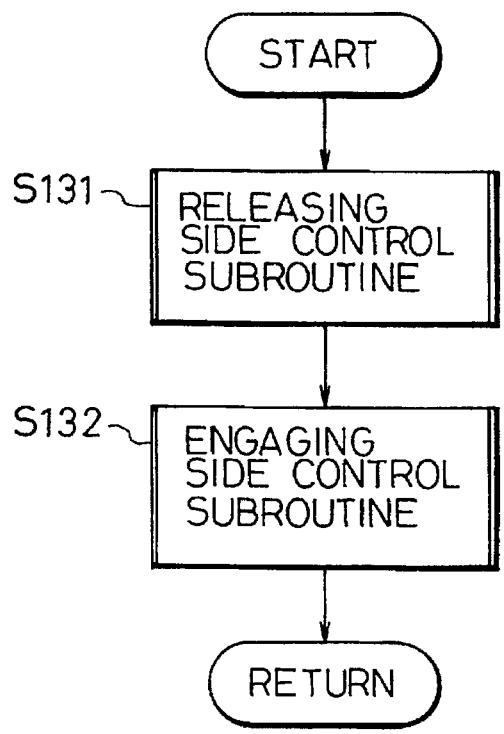
FIG. 12 is a flowchart showing in detail a 4'-3 shift control subroutine forming part of the shift control subroutine shown in FIG. 9.
Figure 13:
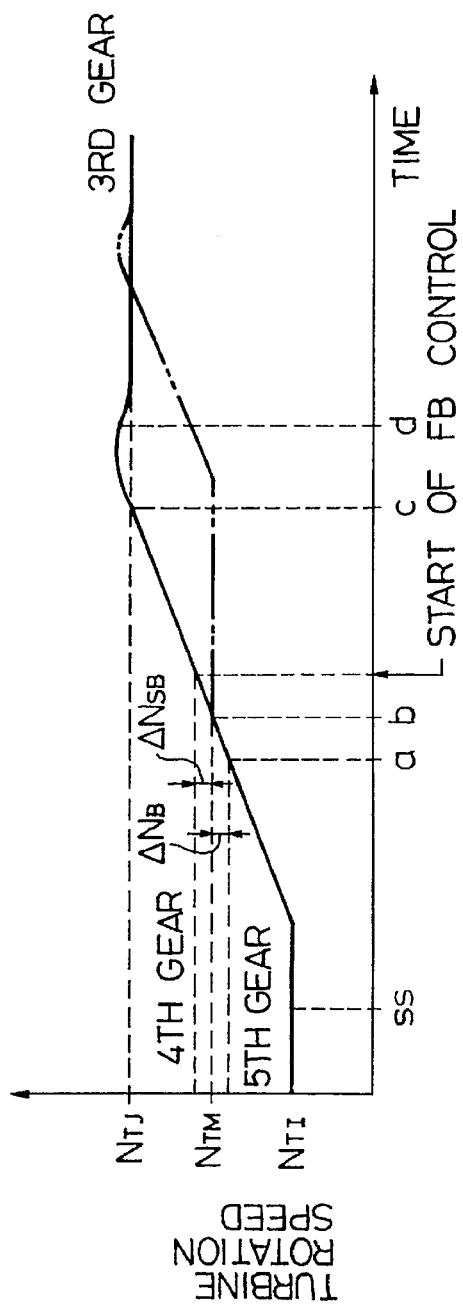
FIG. 13 is a graph showing a change in the turbine/ rotation speed during the 5-3 shifting.

As specifically shown in FIG. 12, in the 4'–3 shift control subroutine, a releasing control subroutine for the second brake 23 is executed in the step S131 of FIG. 12 corresponding to the step S31 of FIG. 6, and an engaging control subroutine for the first clutch 15 is executed in the step S132 of FIG. 12 corresponding to the step S32 of FIG. 6. More specifically, in order to set the increase rate of the turbine rotation speed $N_T$ from the 4'th-speed in-gear rotation speed $N_{TM}$ to the third-speed in-gear rotation speed $N_{TJ}$ to a target changing rate, the duty ratio of the electromagnetic valve associated with the second brake 23 of the main transmission mechanism 10 is feedback-controlled, as indicated by the solid line in FIG. 17, and the duty ratio of the electromagnetic valve associated with the first clutch 15 of the main transmission mechanism 10 is controlled as indicated by the solid line in FIG. 16. The feedback control (FB control) is started when it is determined that the condition that $N_T > N_{TM} + \Delta N_{SB}$ is satisfied (FIG. 13), where the symbol $\Delta N_{SB}$ is a determination threshold value (for example, 40 rpm). Switching of the duty ratio of the electromagnetic valve associated with the first clutch 15 from 0% to 100% is effected at the time point a preset period before the time of determination of third-speed synchronization (time point c of FIGS. 13 to 16).

As described before, since the engaging hydraulic pressure for the second brake 23 is set such that it starts to slide at the time when the 4'th-speed in-gear (point b in FIG. 13) is achieved, a time period during which the 4'th speed is established can be suppressed to substantially 0. As a result, the turbine rotation speed $N_T$ continuously rises as indicated by the solid line in FIG. 13, and a shift shock can be alleviated and the shift response can be improved in comparison with the conventional skip down-shift indicated by the one-dot chain line.

After this, as the 4'–3 shift process proceeds, the operating oil is discharged from the second brake 23 to release the sun speed 18 of the second planetary gear 13, and the operating oil is supplied to the first clutch 15 to couple the sun speed 14 of the first planetary speed 12 to the input shaft 11. As described above, the electromagnetic valve associated with the first clutch 15 is driven with the duty ratio 100% from the time before the time point of determination of third-speed synchronization (time point c). For this reason, the ineffective stroke of the first clutch 15 is just finished at the time of determination of third-speed synchronization and torque transmission via the first clutch 15 can be effected.

Next, a speed change control method for an automatic transmission according to a third embodiment of this invention is explained.

The method of this embodiment is similar to the method of the second embodiment except the preceding control subroutine for starting the releasing control of the second brake 23 prior to setting of the 4'th speed, which brake is the friction engaging element corresponding to the releasing side speed-changing element of the 4'th speed side. In the preceding control subroutine of the second embodiment (FIG. 11), the electromagnetic valve associated with the second brake 23 is driven with the least sufficient duty ratio $D_H$ corresponding to the least sufficient hydraulic pressure supplied to the second brake 23 such that the brake 23 does not slide in the 5–4' shift process during a period from the moment when the predetermined time period $t_a$ has elapsed from the time of output of the 5–3 shift command to the moment the 4'th speed is established, and the second brake instantaneously starts to slide so as to start the 4'3 shift when synchronization for the 4'th speed is achieved. In the preceding control subroutine of this embodiment, however, the duty ratio $D_H'$ slightly larger than the least sufficient duty ratio $D_H$ is output when the predetermined time period $t_a$ has elapsed, and then, the duty ratio is gradually reduced.

Figure 19:
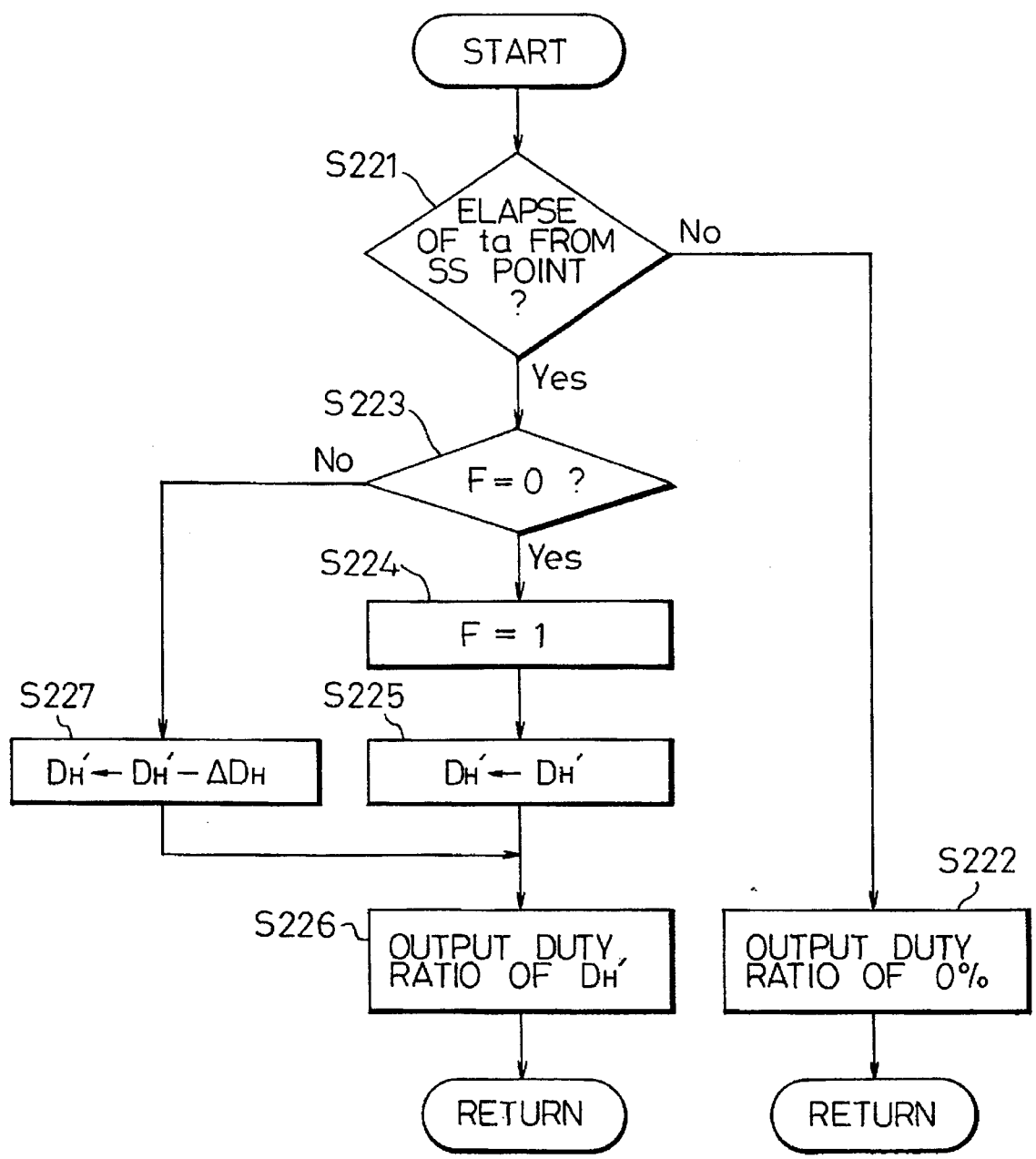
FIG. 19 is a flowchart showing in detail a preceding control subroutine forming part of a 5-3 shift control subroutine according to a third embodiment of this invention.

More specifically, as shown in FIG. 19, whether or not a predetermined time period ta, corresponding to the turbine torque $T_{TM}$, has elapsed from the time when the 5–3 shift command is output (point ss) is determined in the step S221 corresponding to the step 121 of FIG. 11. If the result of determination is "NO", the control flow proceeds to the step S222 wherein the electromagnetic valve associated with the second brake 23 is driven with the duty ratio 0%.

After this, if it is determined that the predetermined time period $t_a$ has elapsed, a determination is made as to whether or not a flag F is set to a value "0" which indicates that the predetermined time period $t_a$ has elapsed just before (step S223). If the result of determination is "YES", the value of the flag is set to "1" (step S224), and the duty ratio of the electromagnetic valve associated with the second brake 23 is set to the initial value $D_H'$ (step S225). Next, the electromagnetic valve is driven with the duty ratio $D_H'$ set in the step S225 (step S226). Whereupon, execution of the preceding control subroutine in the present cycle is completed.

Since the result of determination in the step S221 becomes "YES" in the subroutine in the next cycle and the result of determination in the step S223 becomes "NO", the control flow proceeds to the step S227 wherein the duty ratio is set to a value $(D_H' - \Delta D_H)$ obtained by subtracting a preset value $\Delta D_H$ from the present duty ratio $D_H'$. Then, the electromagnetic valve is driven with the duty ratio $D_H'$ set in the step S227 (step S226) and execution of the control subroutine in the present cycle is completed.

Figure 20:
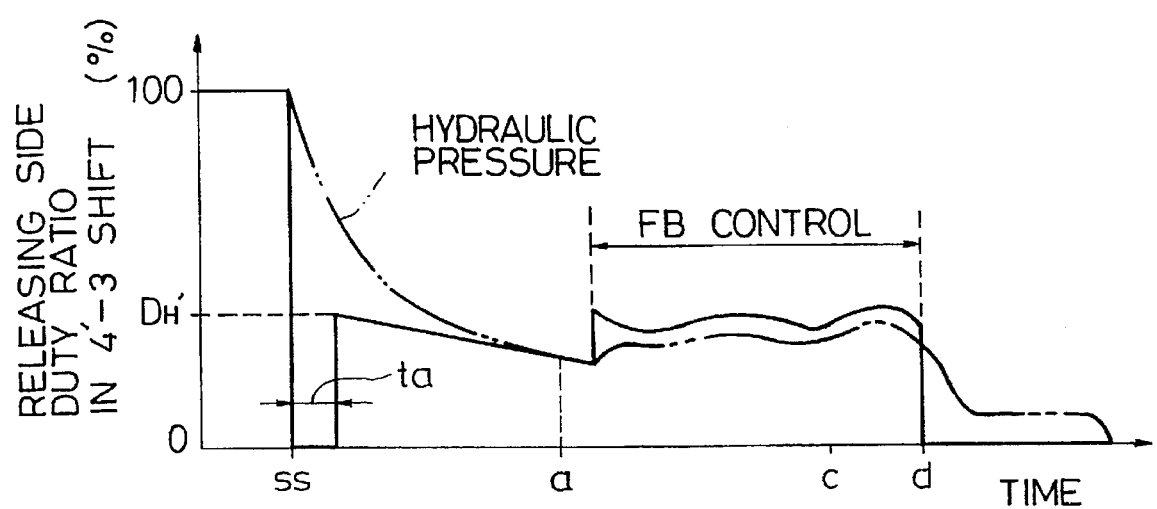
FIG. 20 is a graph showing a change in the valve opening duty ratio of an electromagnetic valve associated with a releasing-side friction engaging element in the 4'-3 shifting process according to the third embodiment.

In succeeding cycles, a series of electromagnetic valve driving processes consisting of the steps S221, S223, S227 and S226 are executed. As a result, the duty ratio of the second brake 23, which is the friction engaging element corresponding to the releasing side speed-changing element of the 4'th speed, is gradually reduced from the value $D_H'$, which is set to a slightly larger value by taking a margin for the sliding of the brake into consideration, as indicated by the solid line in FIG. 20. Therefore, the engaging hydraulic pressure for the second brake 23 is gradually lowered towards the least sufficient hydraulic pressure as the 5–4' shift process proceeds, as indicated by the two-dot chain line in FIG. 20.

By gradually reducing the engaging hydraulic pressure of the second brake 23 from a value slightly larger than the least sufficient hydraulic pressure, the speed-changing operation can be smoothly effected in comparison with a case wherein the engaging hydraulic pressure to the second brake 23 is held at the least sufficient value during the 5–4 shifting process. The reason is described below.

Generally, the automatic transmission 2 entails a structural variation falling within a manufacturing tolerance, and therefore, it entails an operation characteristic variation. For this reason, in a strict sense, the least sufficient duty ratio $D_H$ of the electromagnetic valve associated with the second brake 23 varies depending on the individual automatic transmissions 2, and therefore, it is generally difficult to uniformly set the least sufficient duty ratio $D_H$ which can be applied to a large number of automatic transmissions 2. That is, if the least sufficient duty ratio $D_H$ is uniformly set, the least sufficient duty ratio $D_H$ may be smaller than an optimum value for some automatic transmissions and may be larger than an optimum value for some other automatic transmissions.

In a case wherein the duty ratio of the electromagnetic valve associated with the second brake 23 is maintained during the 5–4' shifting process, if the least sufficient duty ratio $D_H$ is smaller than the optimum value, the second brake 23 will slide during the 5–4' shifting process, thereby making it impossible to correctly conduct the determination of completion of the 5–4' shifting process (determination of synchronization).

On the other hand, if the least sufficient duty ratio $D_H$ is larger than the optimum value, the start timing of the 4'–3 shifting process is delayed, thereby causing a time period required for shifting to be made longer and causing a shift shock to occur.

If the duty ratio of the electromagnetic valve associated with the second brake 23 is gradually reduced from the value $D_H'$ slightly larger than the least sufficient duty ratio $D_H$, the second brake 23 can be positively prevented from sliding during the 5–4' shifting process. In addition, since the engaging hydraulic pressure for the second brake 23 can be set to the least sufficient hydraulic pressure at the completion time of the 5–4' shifting process, it becomes possible to reliably prevent the start timing of the 4'–3 shifting process from being delayed. As a result, the speed-changing operation can be made more safely and accurately.

The aspect of this invention is not limited to the above first to third embodiments. For example, in the above embodiments, this invention is applied to the down-shift from the fifth speed to the third speed, but this invention can be applied to the other skip down-shift, for example, from the fourth speed to the second speed or from the sixth speed to the fourth speed depending on the structure of the auxiliary transmission 4.

We claim:

1. A speed change control method for an automatic transmission including a first transmission mechanism for establishing a plurality of gear positions, and a second transmission mechanism for establishing a plurality of gear positions, said first and second transmission mechanisms being connected in series with respect to a power transmission, the automatic transmission establishing an arbitrary one of a plurality of shift positions, including first and second shift positions, by a combination of a speed position established in the first transmission mechanism and a gear position established in the second transmission mechanism, a speed ratio of the second shift position being lower than a speed ratio of the first shift position, comprising:

(a) starting a speed-changing operation of the second transmission mechanism to establish a gear position, corresponding to the second shift position, in the second transmission mechanism when a speed change command for instructing a speed change from the first shift position to the second shift position is output; and (b) reducing an engagement force of a first friction element provided in said first transmission mechanism to a predetermined value prior to an initiation of a speed-changing operation in the first transmission mechanism to establish a gear position, corresponding to the second shift position, in the first transmission mechanism before said speed-changing operation in step (a) is completed, said first friction element being engaged when establishing, in the first transmission mechanism, a gear position corresponding to the first shift position, and released when establishing, in the first transmission mechanism, the gear position corresponding to the second shift position.

2. The speed change control method for an automatic transmission according to claim 1, wherein:

said step (a) includes starting said speed-changing operation of said second transmission mechanism when a down-shift command for instructing a shifting to an at-least-two-level lower shift position is output;

said speed-changing operation in said second transmission mechanism started in the step (a) establishes a third shift position in the automatic transmission, said third shift position being defined by a combination of the gear position, corresponding to the second shift position, in the second transmission mechanism and the gear position, corresponding to the first shift position, in the first transmission mechanism; and said step (b) includes starting said speed-changing operation of said first transmission mechanism before said third shift position is established.

3. The speed change control method for an automatic transmission according to claim 2, wherein:

said speed-changing operation of said second transmission mechanism started in said step (a) includes releasing a second friction element provided in the second transmission mechanism, said second friction element being arranged to be engaged when establishing a speed position, corresponding to the first shift position, in the second transmission mechanism; and said third shift position is established when a one-way clutch is locked due to said second friction element being released, said one-way clutch being included in the subsidiary transmission mechanism and being arranged in line, with respect to a power transmission, with said second friction element.

4. The speed change control method for an automatic transmission according to claim 3, wherein said speed-changing operation of said second transmission mechanism started in said step (a) includes engaging a third friction element after the one-way clutch is locked, said included in the second transmission mechanism and being arranged in parallel, with respect to a power transmission, to the one-way clutch.

5. The speed change control method for an automatic transmission according to claim 4, wherein said speed-changing operation of said first transmission mechanism started in said step (b) includes:

detecting a rotation speed of a turbine of a fluid coupling which is connected to an input side of the first transmission mechanism; and starting that speed-changing operation of the first transmission mechanism which establishes the speed position, corresponding to the second shift position, in the first transmission mechanism, when the rotation speed of the turbine has reached a speed which is a predetermined speed lower than a turbine speed to be reached at a moment the third shift position is established.

6. The speed change control method for an automatic transmission according to claim 1, wherein:

said step (a) includes starting said speed-changing operation of said second transmission mechanism when a down-shift command for instructing a shifting to an at-least-two-level lower shift position is output; and said speed-changing operation of said first transmission mechanism includes setting said predetermined value to a value that the first friction element can start to slip at a moment when said speed-changing operation of said second transmission mechanism is completed.

7. The speed change control method for an automatic transmission according to claim 1, wherein said speed-changing operation of said first transmission mechanism includes gradually further reducing the engagement force of the first friction element after the engagement force thereof is reduced to the predetermined value.

8. The speed change control method for an automatic transmission according to claim 7, wherein said speed-changing operation of said first transmission mechanism includes gradually reducing the engagement force of the first friction element to such a value that the first friction element may start to slip at a moment when said speed-changing operation of said second transmission mechanism is completed.

9. The speed change control method for an automatic transmission according to claim 1, wherein said speed-changing operation of said first transmission mechanism includes detecting an input torque supplied to the automatic transmission, and setting said predetermined value based on a detected value of the input torque.

10. The speed change control method for an automatic transmission according to claim 1, wherein said speed-changing operation of said first transmission mechanism includes reducing the engagement force of the first friction element after a predetermined time period has elapsed from a moment when a speed change command was output.

11. The speed change control method for an automatic transmission according to claim 10, wherein said speed-changing operation of said first transmission mechanism includes detecting an input torque supplied to the automatic transmission, and setting the predetermined value based on the detected input torque.

* * * * *